US012124797B2

(12) United States Patent
Takagi et al.

(10) Patent No.: US 12,124,797 B2
(45) Date of Patent: Oct. 22, 2024

(54) INFORMATION PROCESSING DEVICE, DISCERNING METHOD, AND DISCERNING PROGRAM

(71) Applicant: Nippon Telegraph and Telephone Corporation, Tokyo (JP)

(72) Inventors: Ikuko Takagi, Tokyo (JP); Shiro Ogasawara, Tokyo (JP); Koji Tsuji, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 466 days.

(21) Appl. No.: 17/427,279

(22) PCT Filed: Jan. 22, 2020

(86) PCT No.: PCT/JP2020/002195
§ 371 (c)(1),
(2) Date: Jul. 30, 2021

(87) PCT Pub. No.: WO2020/162187
PCT Pub. Date: Aug. 13, 2020

(65) Prior Publication Data

US 2022/0101643 A1 Mar. 31, 2022

(30) Foreign Application Priority Data

Feb. 6, 2019 (JP) ................................ 2019-020094

(51) Int. Cl.
*G06K 9/00* (2022.01)
*G06F 40/186* (2020.01)
(Continued)

(52) U.S. Cl.
CPC .......... *G06F 40/194* (2020.01); *G06F 40/186* (2020.01); *G06V 30/1448* (2022.01);
(Continued)

(58) Field of Classification Search
CPC ............. G06V 30/1448; G06V 30/412; G06V 30/416; G06V 2201/01
See application file for complete search history.

(56) References Cited

U.S. PATENT DOCUMENTS 6,681,046 B1 * 1/2004 Kashiwagi ........... G06V 30/412 382/286
8,254,721 B2 * 8/2012 Tamura ................ G06V 30/127 382/229
(Continued)

FOREIGN PATENT DOCUMENTS

JP 2008021068 1/2008
JP 2018010489 1/2018
JP 2018156455 10/2018

OTHER PUBLICATIONS

Intelligent Forms Processing, R. G. Casey et al., IBM Systems Journal, 1990, pp. 435-450 (Year: 1990).*
(Continued)

*Primary Examiner* — Jayesh A Patel
(74) *Attorney, Agent, or Firm* — Fish & Richardson P.C.

(57) ABSTRACT

An information processing device (10) acquires a plurality of ledger sheets having the same layout, compares the contents of each column at the same position each of the acquired plurality ledger sheets having the same layout, discriminates the type of each column according to the comparison result, and stores the information on the type of each column in a storage unit (14). Moreover, the information processing device (10) acquires position information of a processing target ledger sheet, compares information on the type of a column and the content of each column using information on a registered style with respect to the acquired ledger sheet, discriminates the type of each column of the processing target ledger sheet according to the comparison
(Continued)

result, and specifies style candidates of the processing target ledger sheet on the basis of the discrimination result.

18 Claims, 29 Drawing Sheets

(51) Int. Cl.
*G06F 40/194* (2020.01)
*G06V 30/14* (2022.01)
*G06V 30/412* (2022.01)
*G06V 30/416* (2022.01)

(52) U.S. Cl.
CPC .......... *G06V 30/412* (2022.01); *G06V 30/416* (2022.01); *G06V 2201/01* (2022.01)

(56) References Cited

U.S. PATENT DOCUMENTS

| | | | | |
|---|---|---|---|---|
| 2002/0152142 | A1* | 10/2002 | Schellmann | G06Q 40/00 705/30 |
| 2009/0006939 | A1* | 1/2009 | DeSpain | G06F 40/18 715/217 |
| 2017/0046324 | A1* | 2/2017 | Hu | G06F 3/04812 |
| 2018/0067916 | A1* | 3/2018 | Tsuchiya | G06F 18/24 |
| 2020/0082218 | A1* | 3/2020 | Hoehne | G06N 3/08 |
| 2020/0089987 | A1* | 3/2020 | Isaev | G06F 18/22 |
| 2021/0110152 | A1* | 4/2021 | Noda | G06V 30/416 |
| 2022/0101643 | A1* | 3/2022 | Takagi | G06V 30/416 |

OTHER PUBLICATIONS

A Survey of Methods and Strategies in Character Segmentation, Richard G. Casey et al., IEEE, 1996, pp. 690-706 (Year: 1996).*

* cited by examiner

Fig. 3

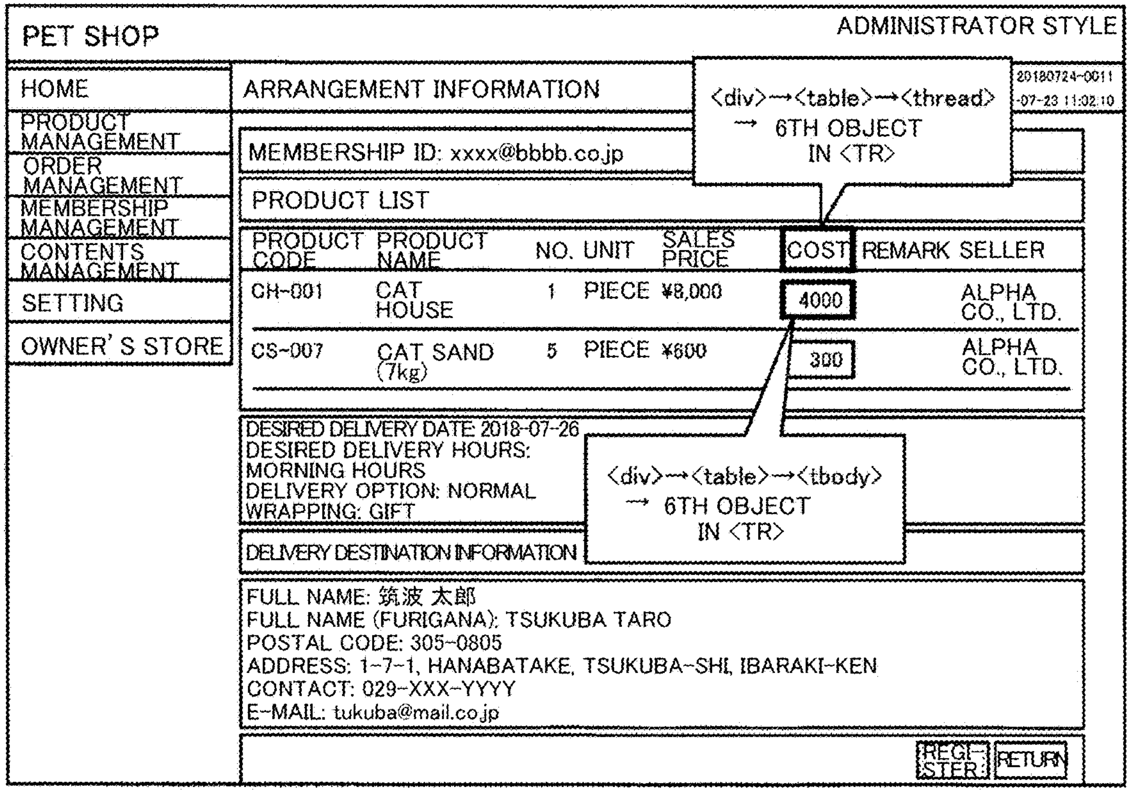

LEFT SCREEN OBJECT INFORMATION

```
<div class="box-body">
  <table class="table">
    <thead>
      <tr class="active">
        <th> PRODUCT CODE </th>
        <th>PRODUCT NAME </th>
        <th>NO. </th>
        <th>UNIT </th>
        <th>SALES PRICE </th>
        <th>COST </th>
        <th>REMARK </th>
        <th>SELLER </th>
      </tr>
    </thead>
  <tbody>
    <tr>
      <th>CH-001</th>
      <td> CAT HOUSE </td>
      <td>1</td>
      <td> PIECE </td>
      <td>¥8,000</td>
      <td><input type="text" class="form-control
text-right" id="row1" autocomplete="off"
value="4000" size="1" /></td>
       <td></td>
      <td> ALPHA CO., LTD. </td>
    </tr>
</tbody>
  </table>
  </div>
</div><!-- /.box -->
```

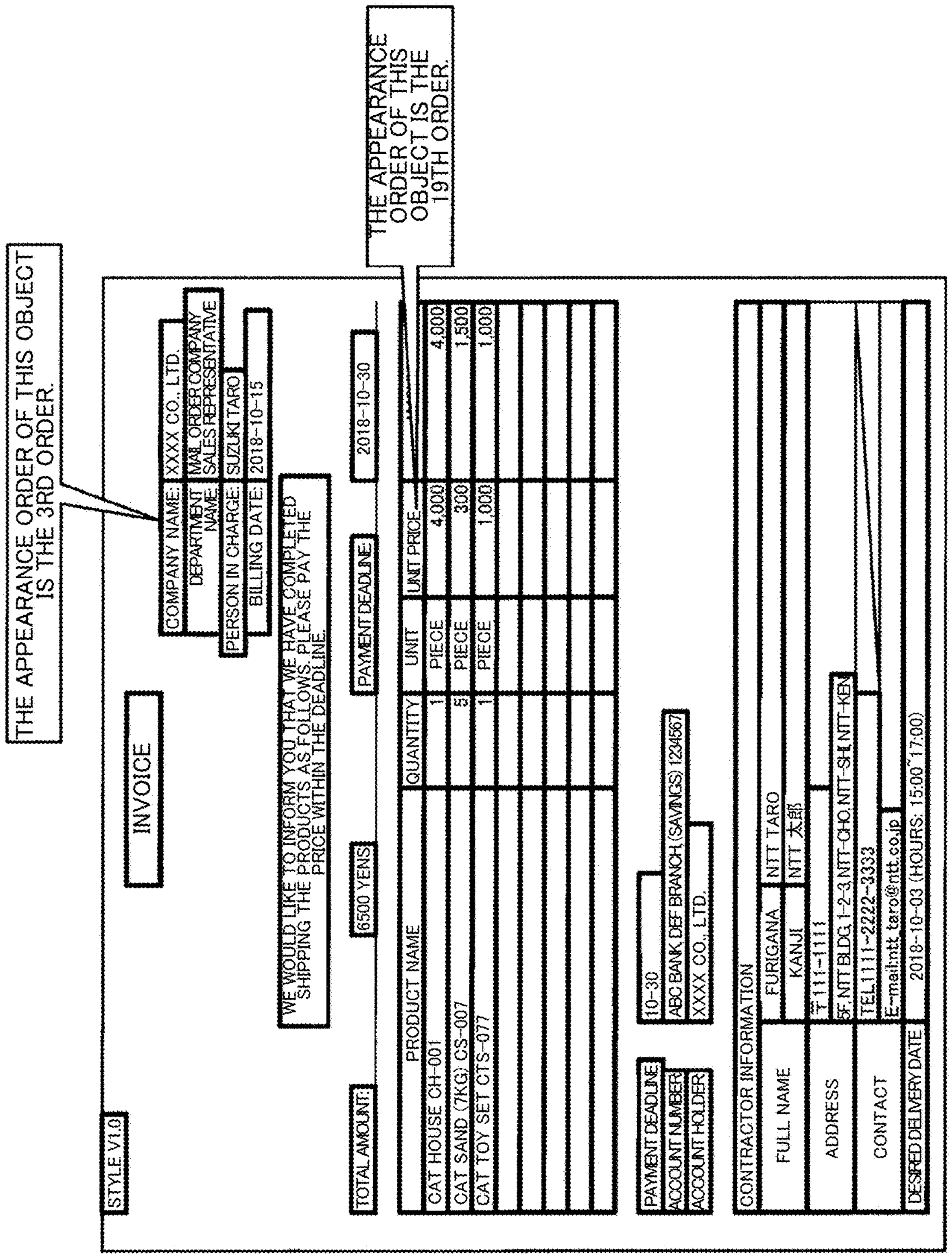

Fig. 4

THE APPEARANCE ORDER OF THIS OBJECT IS THE 3RD ORDER.

THE APPEARANCE ORDER OF THIS OBJECT IS THE 19TH ORDER.

STYLE V1.0

INVOICE

| COMPANY NAME: | XXXX CO., LTD. |
| DEPARTMENT NAME: | MAIL ORDER COMPANY SALES REPRESENTATIVE |
| PERSON IN CHARGE: | SUZUKI TARO |
| BILLING DATE: | 2018-10-15 |

WE WOULD LIKE TO INFORM YOU THAT WE HAVE COMPLETED SHIPPING THE PRODUCTS AS FOLLOWS. PLEASE PAY THE PRICE WITHIN THE DEADLINE.

TOTAL AMOUNT: 6500 YENS

PAYMENT DEADLINE: 2018-10-30

| PRODUCT NAME | QUANTITY | UNIT | UNIT PRICE |
|---|---|---|---|
| CAT HOUSE CH-001 | 1 | PIECE | 4,000 |
| CAT SAND (7KG) CS-007 | 5 | PIECE | 300 |
| CAT TOY SET CTS-077 | 1 | PIECE | 1,000 |
| | | | 4,000 |
| | | | 1,500 |
| | | | 1,000 |

PAYMENT DEADLINE: 10-30
ACCOUNT NUMBER: ABC BANK DEF BRANCH (SAVINGS) 1234567
ACCOUNT HOLDER: XXXX CO., LTD.

CONTRACTOR INFORMATION

| FULL NAME | FURIGANA | NTT TARO |
| | KANJI | NTT 太郎 |
| ADDRESS | 〒111-1111 | |
| | 5F NTT BLDG 1-2-3 NTT-CHO, NTT-SHI, NTT-KEN | |
| CONTACT | TEL111-2222-3333 | |
| | E-mail:ntt_taro@ntt.co.jp | |
| DESIRED DELIVERY DATE | 2018-10-03 (HOURS: 15:00-17:00) | |

Fig. 5

| CONTRACTOR INFORMATION | | |
|---|---|---|
| FULL NAME | FURIGANA | NTT TARO |
| | KANJI | NTT 太郎 |
| ADDRESS | 〒111-1111 | |
| | 5F, NTT BLDG, 1-2-3, NTT-CHO, NTT-SHI, NTT-KEN | |
| CONTACT | TEL1111-2222-3333 | |
| | E-mail:ntt_taro@ntt.co.jp | |
| DESIRED DELIVERY DATE | 2018-10-03 (HOURS: 15:00~17:00) | |

Fig. 7

| ITEM NAME | MATCH DETERMINATION RULE |
|---|---|
| CONTRACTOR INFORMATION | /CONTRACTOR/\|/CONTRACT.?INFO/ |
| FULL NAME | FULL NAME\|NAME |
| FURIGANA | FURIGANA\|KANA |
| KANJI | |
| ADDRESS | /ADDRESS/ |
| CONTACT | |
| TEL: | /TEL/i\|TELEPHONE NUMBER\|PHONE NUMBER |
| e-mail: | /e-mail/i |
| DESIRED DELIVERY DATE | DESIRED DELIVERY DATE\|DESIRED ARRIVAL DATE |

Fig. 15

| WORD | WORD CLASSIFI-CATION | REGISTR-ATION TYPE | REGISTRATION HISTORY |
|---|---|---|---|
| CONTRACTOR INFORMATION | ITEM NAME | AUTO | 10 |
| FULL NAME | ITEM NAME | AUTO | 10 |
| FURIGANA | ITEM NAME | AUTO | 10 |
| KANJI | ITEM NAME | AUTO | 10 |
| ADDRESS | ITEM NAME | AUTO | 10 |
| CONTACT | ITEM NAME | AUTO | 10 |
| TEL: | ITEM NAME | AUTO | 10 |
| E-MAIL: | ITEM NAME | AUTO | 10 |
| DESIRED DELIVERY DATE | ITEM NAME | AUTO | 10 |
| AS KEN | ITEM NAME | AUTO | 3 |
| AS KEN | ITEM VALUE | MANUAL | 3 |
| 電々太郎 | ITEM VALUE | AUTO | 10 |
| DENDEN TARO | ITEM VALUE | AUTO | 10 |
| HIKARINOOKA X-X, YOKOSUKA-SHI, KANAGAWA-KEN | ITEM VALUE | AUTO | 10 |
| 2018-12-05 | ITEM VALUE | AUTO | 10 |
| 012-3456-789 | ITEM VALUE | AUTO | 10 |

Fig. 21

| |
|---|
| SET OF ITEM NAME COLUMNS CORRESPONDING TO EACH ITEM VALUE COLUMN |
| CONTRACTOR INFORMATION, FULL NAME, FURIGANA |
| CONTRACTOR INFORMATION, FULL NAME, KANJI |
| CONTRACTOR INFORMATION, ADDRESS |
| CONTRACTOR INFORMATION, CONTACT, TEL: |
| CONTRACTOR INFORMATION, CONTACT, E-MAIL: |
| CONTRACTOR INFORMATION, CONTACT, DESIRED DELIVERY DATE |

INFORMATION PROCESSING DEVICE, DISCERNING METHOD, AND DISCERNING PROGRAM

CROSS-REFERENCE TO RELATED APPLICATIONS

This application is a National Stage application under 35 U.S.C. § 371 of International Application No. PCT/JP2020/002195, having an International Filing Date of Jan. 22, 2020, which claims priority to Japanese Application Serial No. 2019-020094, filed on Feb. 6, 2019. The disclosure of the prior application is considered part of the disclosure of this application, and is incorporated in its entirety into this application.

TECHNICAL FIELD

The present invention relates to an information processing device, a discrimination method, and a discrimination program.

BACKGROUND ART

Conventionally, ledger sheets created in electronic files or paper have been used in various scenes of business. Here, a ledger sheet is a document created in an electronic file or paper and a system screen in which the name (item name) and the value (item value) are described for each of a plurality of items, and the relationship thereof is represented by the arrangement on a two-dimensional plane.

Although such a ledger sheet has contents which are mostly the same, the style thereof is often different depending on an organization that defines the style of a ledger sheet. Moreover, the style is often changed in the process of business operation. For example, as a conventional technology, a method of enabling an item value column corresponding to an item name of an item designated to be automatically processed to be specified from columns of a ledger sheet by giving information for discriminating the type of a column (the content in a column is an item name or an item value) in advance to discriminate whether the column is an item name or not and then recognizing the correspondence between an item name column and an item value column so that, even the layout is different due to difference in the organization that defined the style of a ledger sheet, revisions during operation, and the like, the position of an item value to be processed automatically described on the ledger sheet can be specified correctly and data can be extracted is known.

CITATION LIST

Patent Literature

[PTL 1] Japanese Patent Application Publication No. 2018-10489

SUMMARY OF THE INVENTION

Technical Problem

However, in the conventional method, as a method of giving information for discriminating the type of each column in advance, when the individual types of respective columns in a ledger sheet are designated manually, there is a problem that it takes a considerable time. When information for discriminating the type of each column is given as a rule regarding visual information such as a background color of a column in a style registration target ledger sheet, it is not possible to discriminate the type of a column correctly in a ledger sheet in which there is no difference in visual information between an item name column and an item value column and it is not possible to discriminate the type of a column by the visual information or a ledger sheet having visual information different from that of a style registration target ledger sheet. Therefore, it is not possible to correctly recognize the correspondence between an item name column and an item value column and specify an item value column to be processed automatically, which is based on the type of a column that is not discriminated correctly.

Means for Solving the Problem

In order to solve the problems and attain the object, an information processing device of the present invention includes a storage unit that stores information on a type of each column included in a ledger sheet for respective styles of a ledger sheet; an acquisition unit that acquires a processing target ledger sheet; and a column type discrimination unit that compares a content of each column of the processing target ledger sheet acquired by the acquisition unit and the information on the type of each column stored in the storage unit, discriminates the type of each column of the processing target ledger sheet according to the comparison result, and specifies style candidates of the processing target ledger sheet.

An information processing device of the present invention includes: an acquisition unit that acquires a plurality of ledger sheets having the same layout; and a column type discrimination unit that compares contents of each column at the same position of each of the plurality of ledger sheets having the same layout acquired by the acquisition unit, discriminates a type of each column according to the comparison result, and stores information on the type of each column in a storage unit.

A discrimination method of the present invention is a discrimination method executed by an information processing device, including: an acquisition step of acquiring a processing target ledger sheet; and a column type discrimination step of comparing a content of each column of the processing target ledger sheet acquired in the acquisition step and the information on the type of each column stored in a storage unit that stores information on a type of each column included in a ledger sheet for respective styles of a ledger sheet, discriminating the type of each column of the processing target ledger sheet according to the comparison result, and specifying style candidates of the processing target ledger sheet.

A discrimination method of the present invention is a discrimination method executed by an information processing device, including: an acquisition step of acquiring a plurality of ledger sheets having the same layout; and a column type discrimination step of comparing contents of each column at the same position of each of the plurality of ledger sheets having the same layout acquired in the acquisition step, discriminating a type of each column according to the comparison result, and storing information on the type of each column in a storage unit.

A discrimination program of the present invention causes a computer to execute: an acquisition step of acquiring a processing target ledger sheet; and a column type discrimination step of comparing a content of each column of the processing target ledger sheet acquired in the acquisition step and the information on the type of each column stored in a storage unit that stores information on a type of each column included in a ledger sheet for respective styles of a ledger sheet, discriminating the type of each column of the processing target ledger sheet according to the comparison result, and specifying style candidates of the processing target ledger sheet.

A discrimination program of the present invention causes a computer to execute: an acquisition step of acquiring a plurality of ledger sheets having the same layout; and a column type discrimination step of comparing contents of each column at the same position of each of the plurality of ledger sheets having the same layout acquired in the acquisition step, discriminating a type of each column according to the comparison result, and storing information on the type of each column in a storage unit.

Effects of the Invention

According to the present invention, it is possible to automatically select a desired style and discriminate the type of a column in a ledger sheet without taking the labor of manually designating the individual types of the respective columns in a style registration target ledger sheet. Moreover, it is possible to automatically discriminate the type of a column in a ledger sheet in which there is no difference in visual information between an item name column and an item value column and a ledger sheet having visual information different from that of a style registration target ledger sheet.

BRIEF DESCRIPTION OF DRAWINGS

FIG. 3 is a diagram for describing the appearance order of objects.

FIG. 4 is a diagram for describing the appearance order of objects.

FIG. 5 is a diagram illustrating an example of a ledger sheet.

FIG. 7 is a diagram illustrating an example of the content of an item name in a ledger sheet and a match determination rule.

FIG. 15 is a diagram illustrating an example of a basic dictionary.

FIG. 21 is a diagram illustrating an example of a relationship between item names corresponding to an item value on a ledger sheet.

DESCRIPTION OF EMBODIMENTS

Hereinafter, embodiments of an information processing device, a discrimination method, and a discrimination program according to the present application will be described in detail with reference to the drawings. The information processing device, the discrimination method, and the discrimination program according to the present application are not limited to these embodiments.

First Embodiment

In the following embodiment, a configuration of an information processing device 10 according to the first embodimentment, a logical configuration of a ledger sheet processing tool 16, and the flow of the processing of the information processing device 10 will be described sequentially, and finally, the effects of the first embodiment will be described.

Configuration of Information Processing Device

Figure 1:
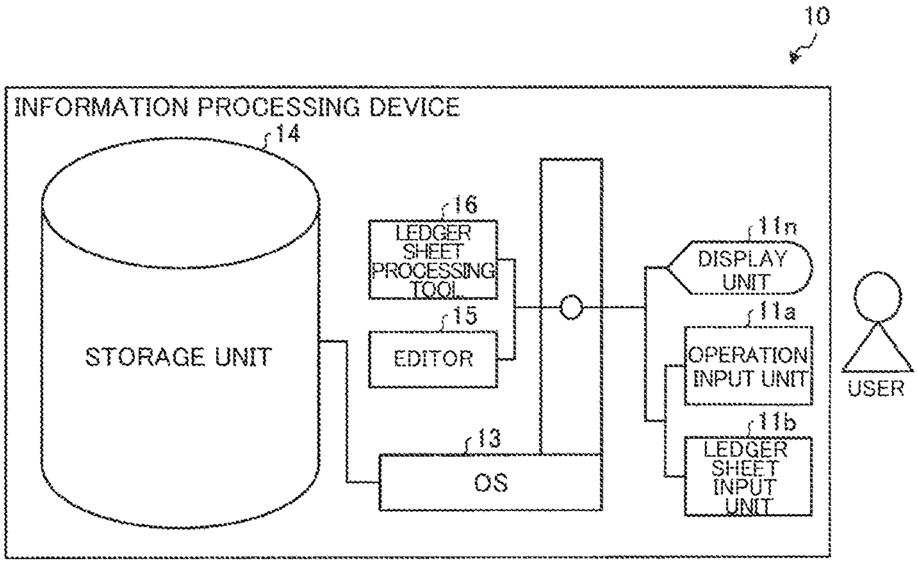
FIG. 1 is a block diagram illustrating a configuration example of an information processing device according to a first embodiment.

First, a configuration example of a system including the information processing device 10 of the present embodiment will be described with reference to FIG. 1. FIG. 1 is a block diagram illustrating a configuration example of an information processing device according to the first embodiment. The configuration illustrated in FIG. 1 is an example only, and a specific configuration is not particularly limited.

The information processing device 10 is a device such as a PC (personal computer) or a smartphone, and for example, processes the content of a ledger sheet mechanically. Moreover, the information processing device 10 performs a process of registering column type discrimination information of a style using two or more ledger sheets having the same layout before mechanically processing the content of a ledger sheet. When the content of a ledger sheet is processed mechanically, the type of columns of an acquired single ledger sheet is discriminated and a style candidate of the acquired single ledger sheet is specified using the registered discrimination information of the columns of a style.

Here, examples of a ledger sheet include electronic data created by an application, a PDF file, structure data of a system screen, and image data (for example, image data converted from an electronic file or a system screen and digital data obtained by scanning paper).

The information processing device 10 includes an operation input unit 11*a*, a ledger sheet input unit 11*b*, a display unit 12, an OS (operating system) 13, a storage unit 14, an editor 15, and a ledger sheet processing tool 16. These constituent components may be distributed to a plurality of devices without being limited to a case where the constituent components are present on the same device.

The operation input unit 11*a* is used for inputting execution commands such as registration of the style of a ledger sheet or mechanical processing and operations for tools such as correction and editing of type discrimination results and includes a keyboard, a mouse, a touch panel, and the like. The ledger sheet input unit 11*b* is used for inputting data and the like of a ledger sheet and includes a camera, a scanner, and the like. The display unit 12 is used for displaying various processing results and includes a display, a touch panel, a speaker, and the like.

In the main body of the information processing device 10, the OS 13 is executed, and the editor 15 for editing various parameters and the like and the ledger sheet processing tool 16 for processing ledger sheets are activated according to the processing of the OS 13.

The storage unit 14 is a storage device such as, for example, a HDD (hard disk drive), a SSD (solid state drive), or an optical disc. The storage unit 14 may be a data-rewritable semiconductor memory such as a RAM (random access memory), a flash memory, or an NVSRAM (non-volatile static random access memory). The storage unit 14 stores, for example, discrimination information of the type of a column to be described later.

Figure 2:
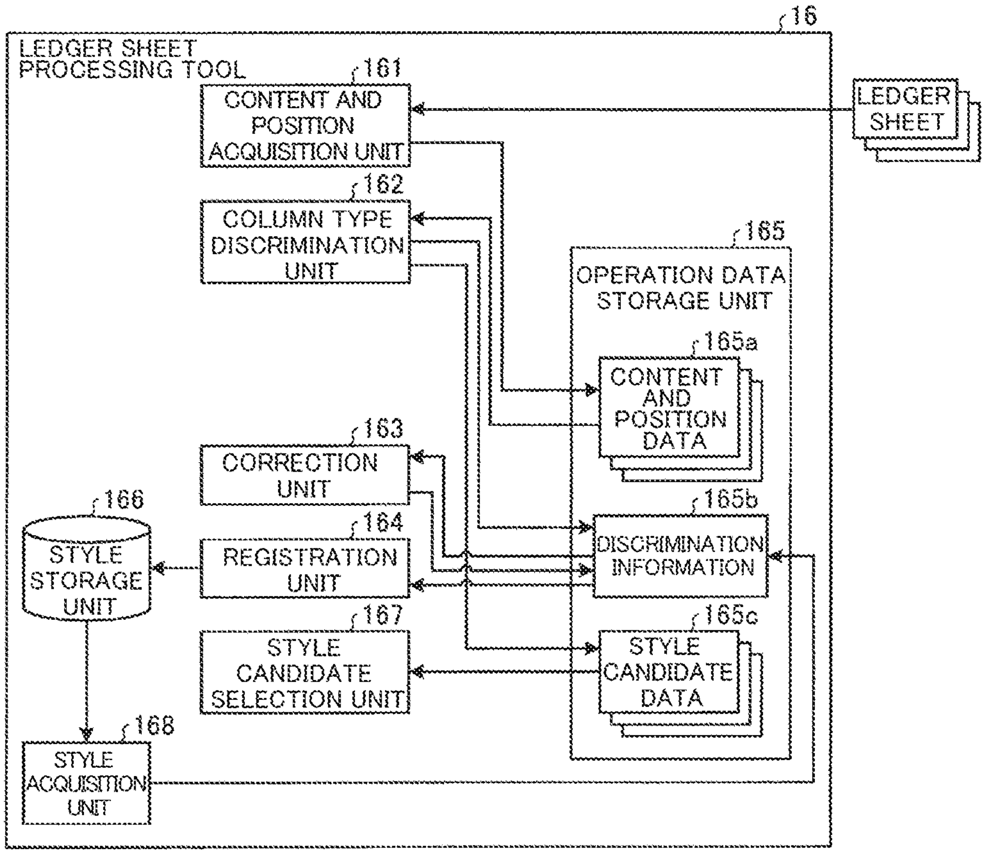
FIG. 2 is a block diagram illustrating a logical configuration of a ledger sheet processing tool in the information processing device according to the first embodiment.

Next, a logical configuration of the ledger sheet processing tool 16 will be described with reference to the example of FIG. 2. FIG. 2 is a block diagram illustrating a logical configuration of a ledger sheet processing tool in the information processing device according to the first embodiment.

As illustrated in FIG. 2, the ledger sheet processing tool 16 includes a content and position acquisition unit 161, a column type discrimination unit 162, a correction unit 163, a registration unit 164, an operation data storage unit 165, a style storage unit 166, a style candidate selection unit 167, and a style acquisition unit 168. Before description of the processing of each unit, first, a process (a style registration process) of registering column type discrimination information and a style using two or more ledger sheets having the same layout will be described. After that, the process (mechanical processing) of discriminating a column type of a ledger sheet and specifying the style candidates of the ledger sheet using the registered column type discrimination information of the style will be described.

The content and position acquisition unit 161 acquires a plurality of ledger sheets having the same layout when performing a style registration process. The content and position acquisition unit 161 acquires content and position data of columns in the plurality of ledger sheets having the same layout.

The content and position acquisition unit 161 stores content and position data 165*a* indicating the content of each column in each of the acquired ledger sheets and the position of each column in the operation data storage unit 165. Here, the position of a column may be arbitrary data as long as it is information for specifying the position of a column, and specifically, refers to the coordinate in a two-dimensional plane of paper, a display, or the like and an appearance order or the like of objects in the data of an electronic file or a screen.

Here, an appearance order will be described with reference to FIGS. 3 and 4. FIGS. 3 and 4 are diagrams for describing the appearance order of objects. The appearance order of objects refers to the order in which the acquired objects are numbered according to a certain rule. For example, in the example of FIG. 3, the appearance order of objects indicates the order of nodes when a tree structure of acquired objects is scanned with priority on depth. Moreover, in the example of FIG. 4, the appearance order of objects indicates the order of nodes when objects are scanned in a Z-shape from the upper left to the lower right. The appearance order of objects of a ledger sheet can be appropriately defined according to a medium such as an electronic file, paper, or a system screen that stores and displays contents of a target ledger sheet.

The column type discrimination unit 162 compares the contents of each column at the same position in each of the plurality of ledger sheets having the same layout acquired by the content and position acquisition unit 161, discriminates the type of each column according to the comparison result, and stores information on the type of each column. For example, the column type discrimination unit 162 acquires the content and position data 165*a* of the plurality of ledger sheets having the same layout, specifies the same position in each ledger sheet using the content and position data 165*a*, and compares the contents of each column at the same position.

When the contents of all columns at the same positions in each ledger sheet are the same, the column type discrimination unit 162 discriminates the type of the columns as an item name. Moreover, when the contents of some columns at the same position in each ledger sheet are different, the column type discrimination unit 162 discriminates the type of the columns as an item value. The discrimination method is not limited thereto, and for example, when the percentage of the same contents of columns at the same position in each ledger sheet is a certain percentage or more, the type of the columns may be discriminated as an item name. That is, for example, when there are five ledger sheets having the same layout, the column type discrimination unit 162 may discriminate the type of columns as an item name when the percentage of the same contents of columns at the same position in each ledger sheet is 80% or more (that is, the contents of columns at the same position are the same in four ledger sheets) and may discriminate the type of columns as an item value when the percentage is smaller than 20%.

Figure 6:
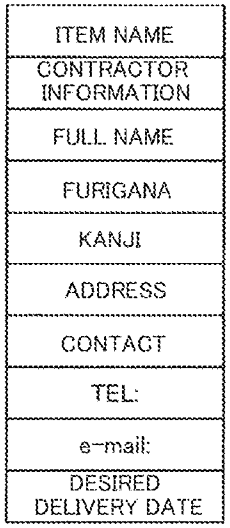
FIG. 6 is a diagram illustrating an example of the content of an item name in a ledger sheet.

The column type discrimination unit 162 registers the discriminated item name in the operation data storage unit 165 for respective ledger sheets as discrimination information 165*b* for discriminating a column type. Here, the discrimination information 165*b* is the content of an item name, for example. Here, an example of the column type discrimination information 165*b* will be described with reference to the example of FIGS. 5 and 6. FIG. 5 is a diagram illustrating an example of a ledger sheet. FIG. 6 is a diagram illustrating an example of the content of an item name in a ledger sheet.

The column type discrimination unit 162 acquires "contractor information", "name", "furigana (pronunciation guides)", "kanji", "address", "contact", "TEL:", "e-mail", and "desired delivery date", which are the contents of the columns discriminated as an item name from the ledger sheet illustrated in FIG. 5. As illustrated in FIG. 6, the column type discrimination unit 162 stores the acquired "contractor information", "name", "furigana", "kanji", "address", "contact", "TEL:", "e-mail", and "desired delivery date" in the operation data storage unit 165 as the column type discrimination information 165*b*.

As illustrated in FIG. 7, the column type discrimination information 165*b* may include a match determination rule as well as the contents of the item name. FIG. 7 is a diagram illustrating an example of a match determination rule and the contents of an item name in a ledger sheet. That is, the column type discrimination information 165*b* may include a match determination rule for determining the type of a column as well as the item name itself when determining the type of a column using the column type discrimination information 165*b*.

The match determination rule is appropriately set manually or automatically. For example, a user manually sets the match determination rule by referring to the content of an item name column. In the notation of the match determination rule, "|" indicates "or", for example. That is, if any one of the character strings described before and after this symbol is matched, it is determined that the rule is satisfied. Moreover, "//" describes a notation according to a regular expression surrounded by //. When this regular expression (including partial match) is satisfied, it is determined that the rule is satisfied (i is determined regardless of case).

The correction unit 163 corrects the column type discrimination information 165*b* registered by the column type discrimination unit 162. For example, the correction unit 163 corrects the column type discrimination information 165*b* according to a user's instruction and stores the same in the storage unit 14. When no correction is made, the correction unit 163 stores the column type discrimination information 165*b* registered by the column type discrimination unit 162 in the storage unit 14 as it is. The registration unit 164 stores the column type discrimination information 165*b* discriminated by the column type discrimination unit 162 and corrected by the correction unit 163 in the style storage unit 166 for respective styles of the ledger sheet. For example, the registration unit 164 stores identification information of a column type in correlation with an identifier for identifying the style of a ledger sheet.

Figure 8:
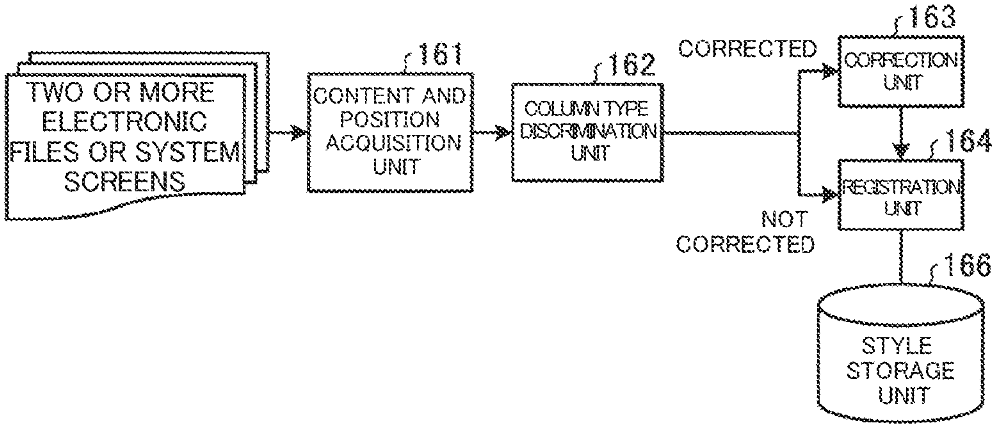
FIG. 8 is a diagram illustrating the flow of a style registration process.

Here, the flow of the style registration process will be described with reference to FIG. 8. FIG. 8 is a diagram illustrating the flow of the style registration process. As illustrated in FIG. 8, the content and position acquisition unit 161 acquires two or more electronic files or system screens in order to acquire a plurality of ledger sheets having the same layout and acquires the content and the position of a column in the plurality of ledger sheets having the same layout.

Figure 9:
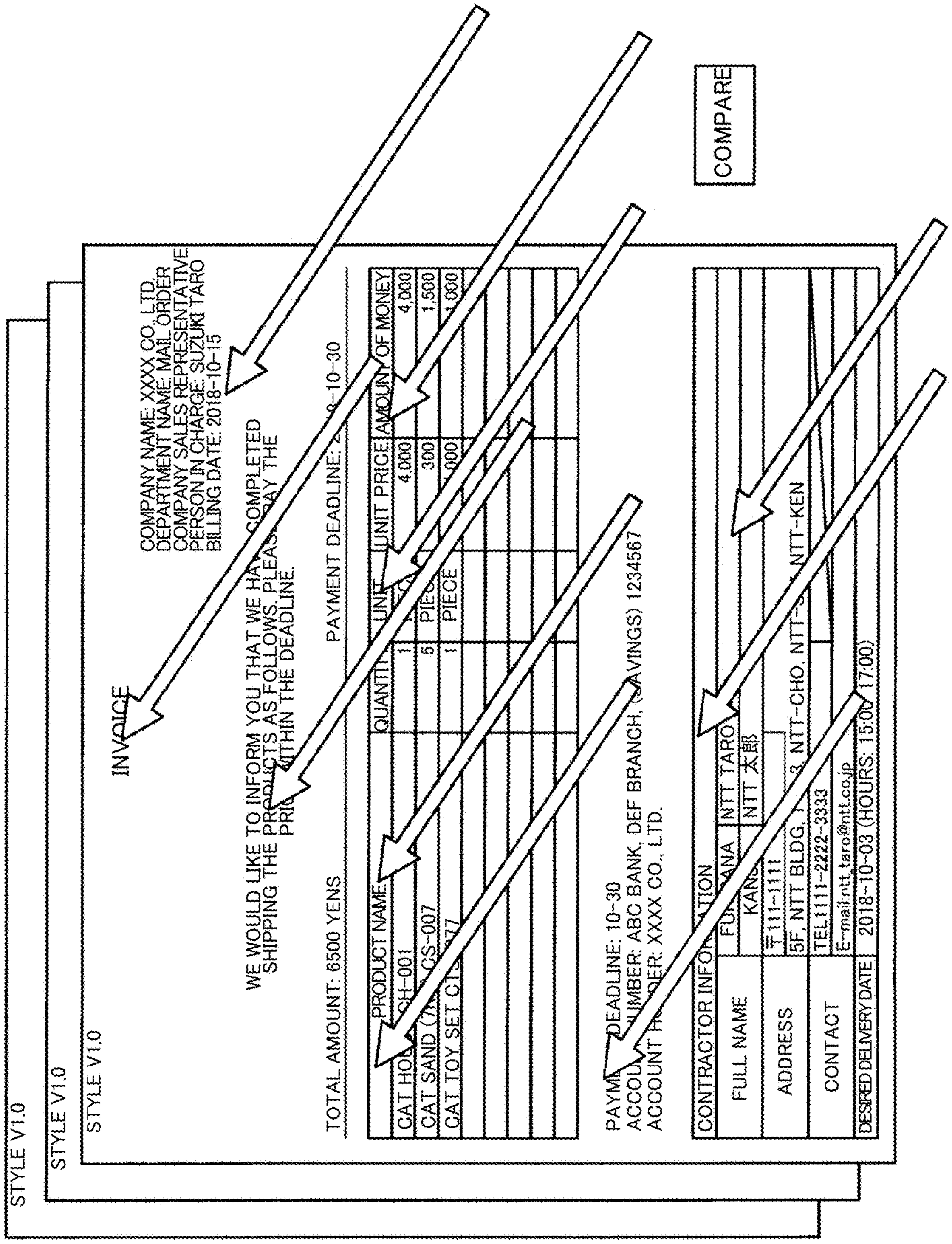
FIG. 9 is a diagram illustrating a process of comparing the sameness of contents between columns at the same position for ledger sheets having the same layout.

The column type discrimination unit 162 compares the contents of each column at the same position in each of the plurality of ledger sheets having the same layout acquired by the content and position acquisition unit 161 and discriminates the type of each column according to the comparison result. For example, in the example of FIG. 9, when a ledger sheet is selected arbitrarily from a ledger sheet group as a reference ledger sheet and "invoice" is described in a column at a predetermined position of the reference ledger sheet, the column type discrimination unit 162 determines whether "invoice" is also described in the column at the same position of another ledger sheet other than the reference ledger sheet. As a result, when "invoice" is also described in the column at the same position of another ledger sheet other than the reference ledger sheet, the column type discrimination unit 162 discriminates that the column is an item name.

When "2018-10-15" is described in a column of a predetermined position of the reference ledger sheet, the column type discrimination unit 162 determines whether "2018-10-15" is also described in the column at the same position of another ledger sheet other than the reference ledger sheet. As a result, when "2018-10-15" is not described in the column at the same position of another ledger sheet other than the reference ledger sheet, the column type discrimination unit 162 discriminates that the column is an item value.

Returning to FIG. 8, the column type discrimination unit 162 stores the discriminated item name in the operation data storage unit 165 and the storage unit 14 for respective styles of the ledger sheet as the discrimination information 165*b* for discriminating the column type. When the discrimination information 165*b* is corrected, the correction unit 163 corrects the column type discrimination information 165*b* according to a user's instruction. After that, the registration unit 164 stores the corrected column type discrimination information in the style storage unit 166 for respective styles of the ledger sheet. When the discrimination information 165*b* is not corrected, the registration unit 164 stores the discrimination information included in each ledger sheet in the style storage unit 166 for respective ledger sheet types using the discrimination information as it is.

Next, a process of discriminating the column type of a ledger sheet and specifying style candidates using the registered column type discrimination information of the style will be described. Returning to FIG. 2, when the contents of a ledger sheet are processed mechanically, the content and position acquisition unit 161 acquires a processing target ledger sheet and acquires the content and position data of the column in the ledger sheet.

The column type discrimination unit 162 discriminates, according to the result of the comparison which will be described below, the type of each column of the processing target ledger sheet according to the comparison result, and specifies the style candidates of the processing target ledger sheet. Here, in the comparison, the column type discrimination unit 162 compares the contents of each column of the processing target ledger sheet acquired by the content and position acquisition unit 161 with the column type discrimination information of the style stored in the style storage unit 166 and acquired by the style acquisition unit 168. The column type discrimination unit 162 stores style candidate data 165*c* indicating the specified style candidates in the operation data storage unit 165.

For example, the type discrimination unit 162 examines whether each column in the processing target ledger sheet matches any one of the item name included in the column type discrimination information of each of the registered styles and the match determination rule thereof, discriminates the matching column as an item name, and discriminates a non-matching column as an item value. Moreover, when the column matching the item name included in the column type discrimination information of each of the registered styles or the match determination rule thereof is present in the processing target ledger sheet, the column type discrimination unit 162 specifies the style as the candidate for a processing target style.

The style candidate selection unit 167 receives the selection of style candidates discriminated by the column type discrimination unit 162. For example, when a plurality of style candidates are specified by the column type discrimination unit 162, the style candidate selection unit 167 causes a user to select which of the plurality of style candidates is applicable. When the column type discrimination unit 162 performs the comparison process, the style acquisition unit 168 acquires the style of each ledger sheet from the style storage unit 166 and stores the same in the operation data storage unit 165 as the column type discrimination information 165*b*.

Figure 10:
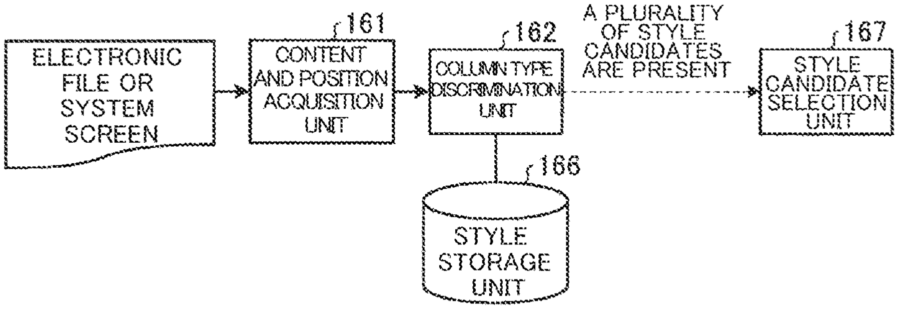
FIG. 10 is a diagram illustrating the flow of a process of discriminating the type of a column of a ledger sheet and determining the style of the ledger sheet.

Here, the flow of the process of discriminating the column type of a ledger sheet and specifying the style candidates using the column type discrimination information of the registered style will be described with reference to FIG. 10. FIG. 10 is a diagram illustrating the process of discriminating the column type of a ledger sheet and determining the style of the ledger sheet. As illustrated in FIG. 10, the content and position acquisition unit 161 acquires a processing target ledger sheet from an electronic file or a system screen and acquires the content and the position of each column in the ledger sheet.

The column type discrimination unit 162 discriminates, according to the result of the comparison which will be described below, the type of each column of the processing target ledger sheet according to the comparison result, and specifies style candidates of the processing target ledger sheet. Here, in the comparison, the column type discrimination unit 162 compares the contents of each column of an input processing target ledger sheet with the column type discrimination information of the style stored in the style storage unit 166 and acquired by the style acquisition unit 168. When a plurality of style candidates are specified by the column type discrimination unit 162, the style candidate selection unit 167 causes a user to select which of the plurality of style candidates is applicable.

Figure 11:
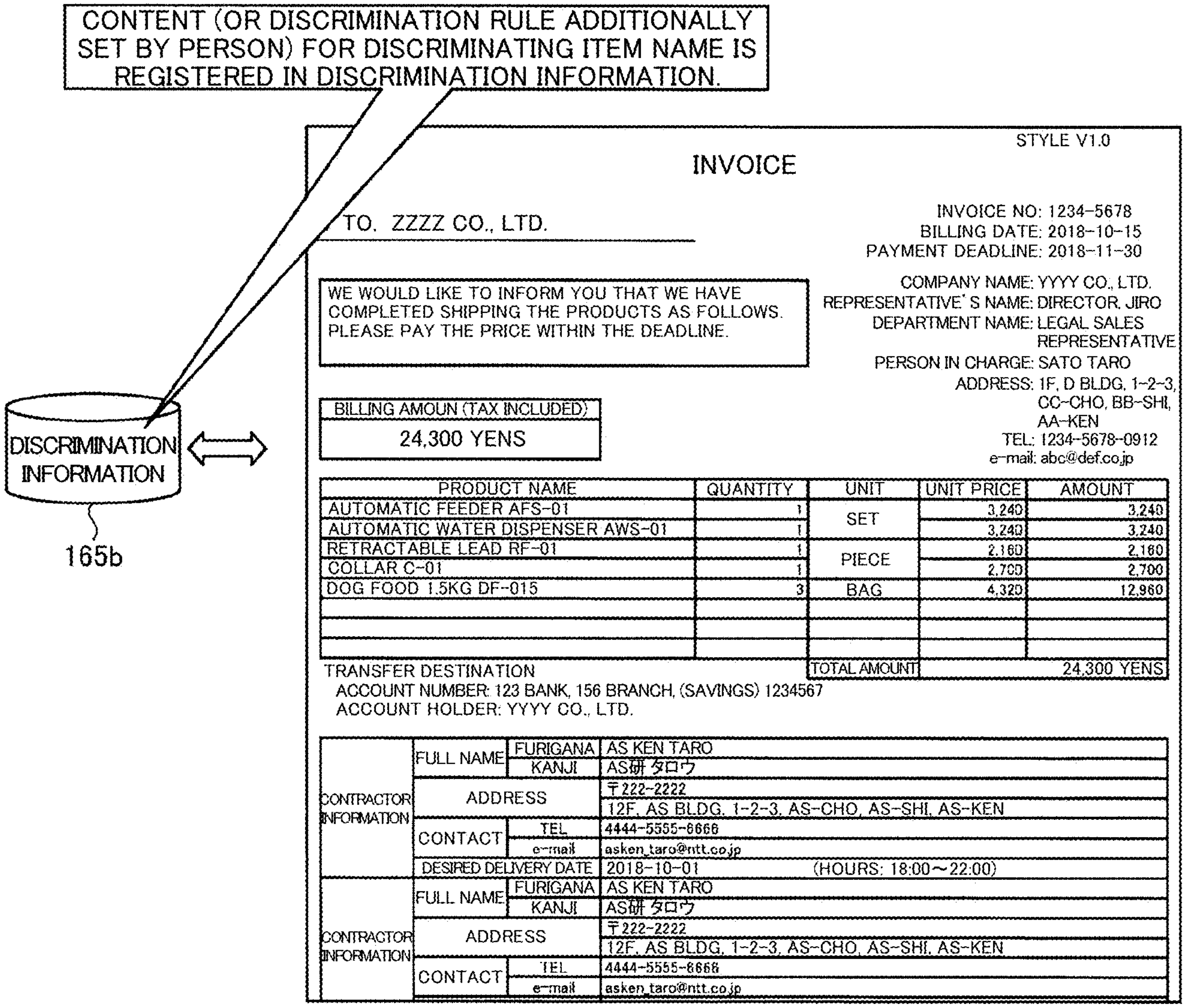
FIG. 11 is a diagram illustrating a process of discriminating the type of a column of a ledger sheet and determining the style of the ledger sheet.

That is, as illustrated in FIG. 11, in the style registration process, when information for discriminating the item name is registered as the column type discrimination information 165*b* and the contents of the processing target ledger sheet are processed mechanically, the column type discrimination unit 162 compares the contents of each column of the input processing target ledger sheet and the column type discrimination information 165*b* and discriminates whether the type of each of the processing target columns is an item name or an item value. For example, in the example of FIG. 11, when "invoice" is present in the column of the input processing target ledger sheet and "invoice" is also present in the column type discrimination information 165*b*, the column type discrimination unit 162 discriminates the type of the column as an item name.

When the column matching the item name included in the column type discrimination information of each of the registered styles or the match determination rule thereof is present in the processing target ledger sheet, the column type discrimination unit 162 specifies the style as the candidate for a processing target style. For example, in the example of FIG. 11, when a column matching the item name included in the column type discrimination information of a certain style or the match determination rule thereof is present in a processing target ledger sheet including an item name such as "invoice", the column type discrimination unit 162 specifies the style as the candidate for a processing target style.

Processing Procedure of Information Processing Device

Figure 12:
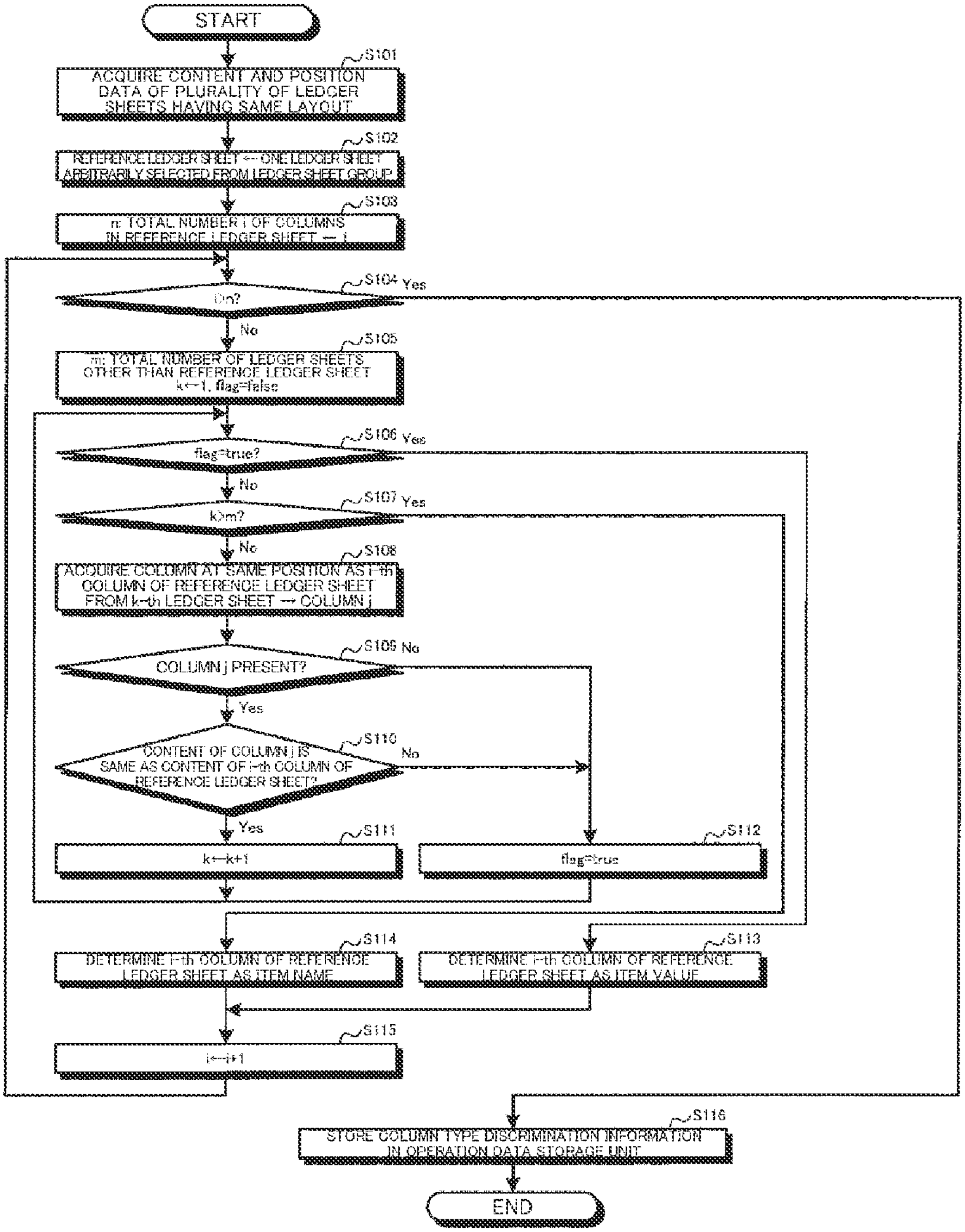
FIG. 12 is a flowchart illustrating an example of the flow of a process of registering discrimination information is the information processing device according to the first embodiment.
Figure 13:
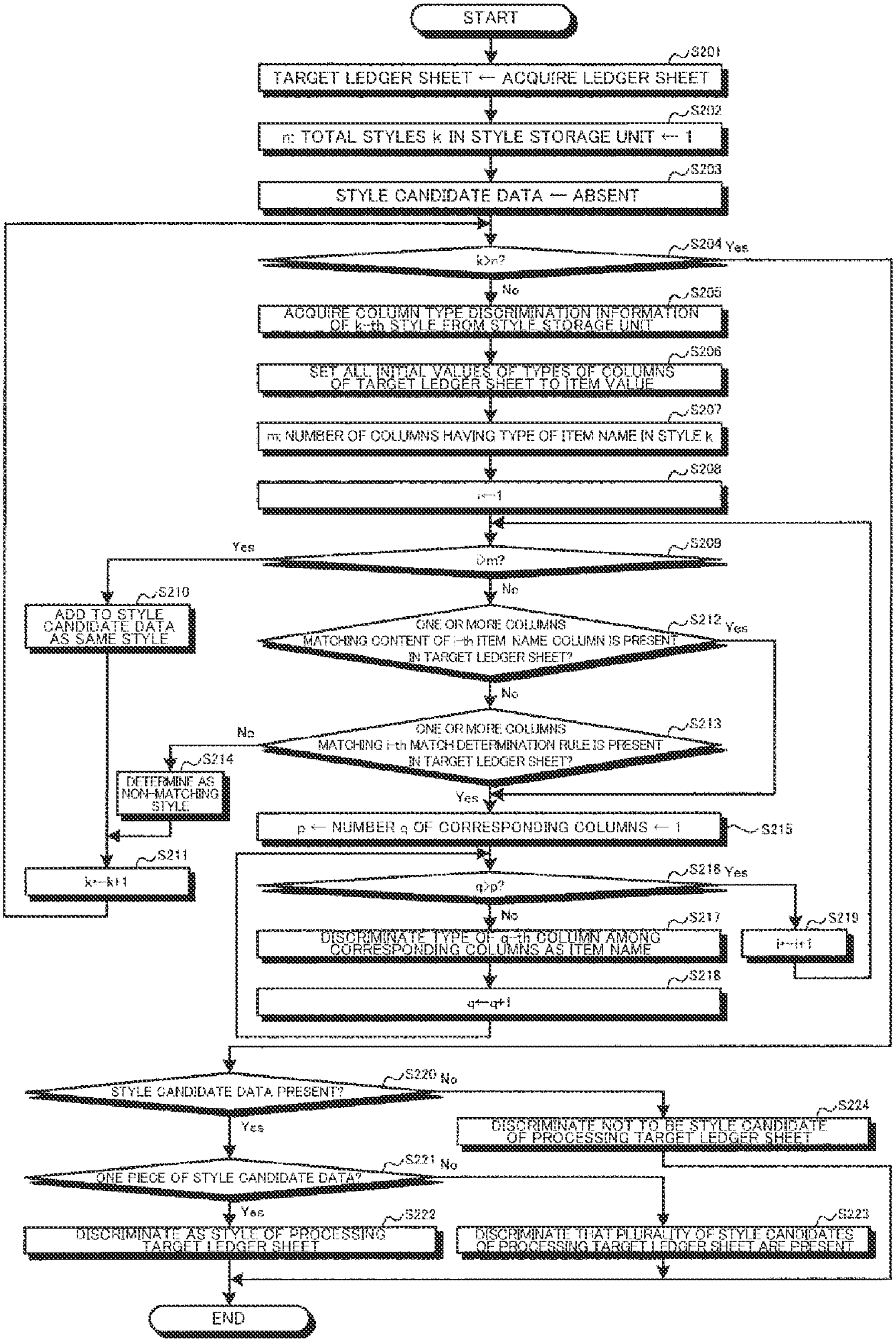
FIG. 13 is a flowchart illustrating an example of the flow of a process of determining the style of a ledger sheet in the information processing device according to the first embodiment.

Next, an example of the processing procedure of the column type discrimination unit 162 of the information processing device 10 according to the first embodiment will be described with reference to FIGS. 12 and 13. FIG. 12 is a flowchart illustrating an example of the flow of a process of creating and registering the column type discrimination information in the column type discrimination unit 162 of the information processing device according to the first embodiment. FIG. 13 is a flowchart illustrating an example of the flow of a process of discriminating the type of a column and specifying a style candidate of a ledger sheet in the column type discrimination unit 162 of the information processing device according to the first embodiment.

First, the flow of a process of creating and registering column type discrimination information using two or more ledger sheets having the same layout will be described with reference to FIG. 12. As illustrated in FIG. 12, the column type discrimination unit 162 acquires the content and position data of a plurality of ledger sheets having the same layout (step S101) and selects an arbitrary ledger sheet from the acquired ledger sheet group as a reference ledger sheet (step S102). The column type discrimination unit 162 sets a total number of columns in the reference ledger sheet as n and sets the value of "1" to i (step S103).

Subsequently, the column type discrimination unit 162 determines whether the value of i is larger than the value of n (step S104). When the value of i is not larger than the value of n (step S104: No), the column type discrimination unit 162 sets a total number of ledger sheets other than the reference ledger sheet as m, sets "1" to k, and sets a flag to "false" (step S105).

The column type discrimination unit 162 determines whether the flag is "true" (step S106). When the flag is not "true" (step S106: No), the column type discrimination unit 162 determines whether the value of k is larger than the value of m (step S107). When the value of k is not larger than the value of m (step S107: No), the column type discrimination unit 162 acquires a column at the same position as an i-th column of the reference ledger sheet from a k-th ledger sheet as a column j (step S108).

The column type discrimination unit 162 determines whether the column j is present (step S109). When the column j is present (step S109: Yes), the column type discrimination unit 162 determines whether the content of the column j is the same as that of the i-th column of the reference ledger sheet (step S110). When it is determined that the content of the column j is the same as that of the i-th column of the reference ledger sheet (step S110: Yes), the column type discrimination unit 162 adds "1" to the value of k (step S111) and the flow returns to step S106. When the column j is not present (step S109: No), or it is determined that, although the column j is present, the content of the column j is not the same as that of the i-th column of the reference ledger sheet (step S110: No), the column type discrimination unit 162 sets the flag to "true" (step S112) and the flow returns to step S106.

In the process of step S107, when the value of k is larger than the value of m (step S107: Yes), the column type discrimination unit 162 determines the i-th column of the reference ledger sheet as an item name (step S114) and adds "1" to the value of i (step S115), and the flow returns to step S104.

In the process of step S106, when the flag is "true" (step S106: Yes), the column type discrimination unit 162 determines the i-th column of the reference ledger sheet as an item value (step S113) and adds "1" to the value of i (step S115), and the flow returns to step S104.

When it is determined in step S104 that the value of i is larger than the value of n (step S104: Yes), the column type discrimination unit 162 stores the column type discrimination information in the operation data storage unit 165 (step S116).

Next, the flow of a process of discriminating the type of a column of a ledger sheet and specifying a style candidate using the registered column type discrimination information will be described with reference to FIG. 13. As illustrated in FIG. 13, the column type discrimination unit 162 acquires the content and position data of an acquired ledger sheet as a target ledger sheet (step S201), sets a total number of styles in the style storage unit 166 as the value of n and sets the value of "1" to k (step S202). The column type discrimination unit 162 sets "absent" to style candidate data (step S203) and determines whether k is larger than n (step S204).

Subsequently, when k is not larger than n (step S204: No), the column type discrimination unit 162 acquires column type discrimination information of a k-th style from the style storage unit 166 (step S205) and sets all the initial values of the types of columns of the target ledger sheet to an item value (step S206). The column type discrimination unit 162 sets the number m of columns having the type of an item name in the style k (step S207) and sets she value of "1" to i (step S208).

Subsequently, the column type discrimination unit 162 determines whether the value of i is larger than the value of m (step S209). When the value of i is not larger than the value of m (step S209: No), the column type discrimination unit 162 determines whether at least one column matching the content of an i-th item name column is present in the target ledger sheet (step S212). When at least one column matching the content of the i-th item name column is not present (step S212: No), the column type discrimination unit 162 determines whether at least one column matching an i-th match determination rule is present in the target ledger sheet (step S213). When at least one column matching the i-th match determination rule is not present in the target ledger sheet (step S213: No), the column type discrimination unit 162 determines that the style does not match (step S214) and the flow proceeds to step S211.

When at least one column matching the i-th match determination rule is present in the target ledger sheet (step S213: Yes), the column type discrimination unit 162 proceeds to step S215. When it is determined in step S212 that at least one column matching the content of the i-th item name column is present (step S212: Yes), the column type discrimination unit 162 proceeds to step S215.

In step S215, the column type discrimination unit 162 sets the number of the corresponding columns (that is, the columns matching the content of the i-th item name column or the match determination rule) to p and sets the value of "1" to q (step S215). The column type discrimination unit 162 determines whether the value of q is larger than the value of p (step S216). When the value of q is not larger than the value of p (step S216: No), the column type discrimination unit 162 discriminates the type of a q-th column among the columns as an item name (step S217) and adds "1" to the value of q (step S218), and the flow returns to step S216.

When it is determined in step S216 that the value of q is larger than the value of p (step S216: Yes), the column type discrimination unit 162 adds "1" to the value of i (step S219), and the flow returns to step S209.

When it is determined in step S209 that the value of i is larger than the value of m (step S209: Yes), the column type discrimination unit 162 adds the style to the style candidate data as the same style (step S210) and adds "1" to the value of k (step S211), and the flow returns to step S204.

When it is determined in step S204 that the value of k is larger than the value of n (step S204: Yes), the column type discrimination unit 162 determines whether style candidate data is present (step S220). When the style candidate data is present (step S220: Yes), the column type discrimination unit 162 determines whether the number of pieces of style candidates is 1 (step S221).

When the number of pieces of style candidate data is 1 (step S221: Yes), the column type discrimination unit 162 discriminates the style candidate data as the style of the processing target ledger sheet (step S222).

When the number of pieces of style candidate data is not 1 (step S221: No), the column type discrimination unit 162 determines that there are a number of pieces of style candidates of the processing target ledger sheet (step S223). When it is determined in step S220 that the style candidate data is not present (step S220: No), the column type discrimination unit 162 determines that the style candidate of the processing target ledger sheet is not present (step S224).

Effects of First Embodiment

The information processing device 10 according to the first embodiment acquires a plurality of ledger sheets having the same layout, compares the contents of each column at the same position of each of the acquired plurality of ledger sheets having the same layout, discriminates the type of each column according to the comparison result, and registers the information on the type of each column in the storage unit 14. Therefore, the information processing device 10 can automatically discriminate the type of a column in a ledger sheet without taking the labor of manually designating the type of each column in the ledger sheet. Moreover, the present invention can be applied to a ledger sheet having no difference in visual information between an item name column and an item value column.

The information processing device 10 compares the content of each column of an input processing target ledger sheet and the content of the column type discrimination information stored in the storage unit 14, discriminates the type of each column of the processing target ledger sheet according to the comparison result, and specifies the style candidate of the processing target ledger sheet. Therefore, the information processing device 10 can discriminate the type of each column and specify the style candidate of the processing target ledger sheet even when the processing target ledger sheet is a ledger sheet having no difference in visual information between an item name column and an item value column and a ledger sheet having visual information different from that of a style registration target ledger sheet.

Modified Example of First Embodiment

The information processing device 10 may learn conditions to be satisfied by an item name column by using a basic dictionary and applying a discrimination result to the basic dictionary in order to discriminate the type of a column. The column type discrimination unit 162 of the information processing device 10 learns item name discrimination conditions by applying the column type discrimination information of acquired styles to a basic dictionary. Therefore, as a modified example of the first embodiment, a case in which the column type discrimination unit 162 of the information processing device 10 performs discrimination similarly to the first embodiment and then refers to a basic dictionary further to discriminate the type of a column as an item value when the content of the column is stored in the basic dictionary as a word that is not an item name will be described. The description of the same configuration and processing as those of the first embodiment will be omitted.

Figure 14:
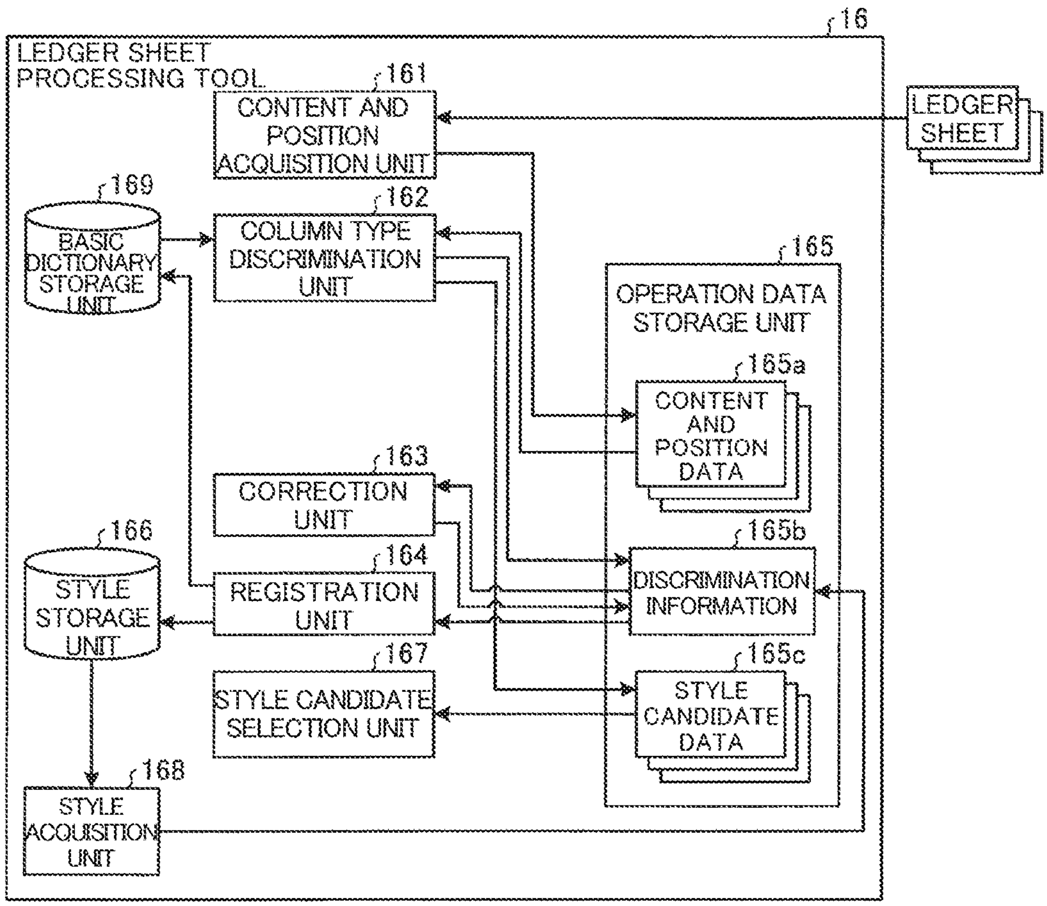
FIG. 14 is a block diagram illustrating a logical configuration of a ledger sheet processing tool in an information processing device according to a modified example of the first embodiment.

FIG. 14 is a block diagram illustrating a logical configuration of a ledger sheet processing tool in an information processing device according to a modified example of the first embodiment. As illustrated in FIG. 14, the ledger sheet processing tool 16 includes a basic dictionary storage unit 169 that stores a basic dictionary.

The basic dictionary will be described with reference to FIG. 15. FIG. 15 is a diagram illustrating an example of a basic dictionary. As illustrated in FIG. 15, "word", "word classification" indicating whether the word is registered as an item name or not, "registration type" indicating whether the word is registered automatically or manually, and "registration history" indicating the number of registrations of the combination of a word and a word classification are stored in correlation in the basic dictionary storage unit 169 as a basic dictionary.

The registration unit 164 adds the content of a column discriminated as an item name during style registration to the basic dictionary as a word that is an item name. Moreover, the registration unit 164 adds the content of a column discriminated to be not the item name via the correction unit 163 to the basic dictionary as a word that is not an item name.

The basic dictionary is used when discriminating the type of a column of a ledger sheet using the column type discrimination information of the registered style. The column type discrimination unit 162 performs discrimination similarly to the first embodiment and then refers to the basic dictionary to discriminates the type of a column as an item name when the content of the column is stored in the basic dictionary as a word that is an item name.

The basic dictionary is also used as the conditions for discriminating as an item name during registration of other styles. The column type discrimination unit 162 performs discrimination similarly to the first embodiment and then refers to the basic dictionary to discriminate the type of a column as an item value when the content of the column is stored in the basic dictionary as a word that is not an item name.

The column type discrimination unit 162 may change the conditions for discriminating as an item name according to the registration history included in the basic dictionary. The registration unit 164 increases the number of registrations that the word of the content of the column discriminated as an item name during style registration is an item name by 1. When the type of a column is corrected from an item name to an item value by the correction unit 163, the registration unit 164 increases the number of registrations that the word of the content of the column is not an item name by 1.

The basic dictionary is used when discriminating the type of a column of a ledger sheet using the column type discrimination information of a registered style. In this case, the registration history is also taken into consideration as well as matching of contents. For example, when the same word as the column of which the type is discriminated as an "item value" by the "column type discrimination unit" of the first embodiment is registered in the basic dictionary and the number of registrations as a word that is an item name is larger than a certain threshold or the ratio of the number of registrations as a word that is an item name to the number of registrations as a word that is not an item name is larger than a certain threshold, the column type discrimination unit 162 determines that the column is an item name.

The basic dictionary is also used as the conditions for discriminating as an item name by the "column type discrimination unit" during registration of other styles. In this case, the registration history is also taken into consideration as well as matching of contents. For example, when the same word as the column of which the type is discriminated as an "item name" by the "column type discrimination unit" of the first embodiment is registered in the basic dictionary and the number of registrations as a word that is not an item name is larger than a certain threshold or the ratio of the number of registrations as a word that is not an item name to the number of registrations as a word that is an item name is larger than a certain threshold, the column type discrimination unit 162 determines that the column is not an item name.

Figure 16:
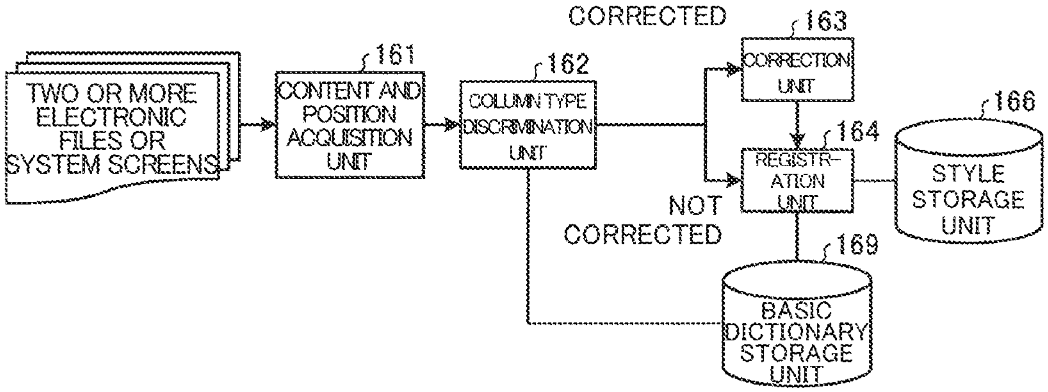
FIG. 16 is a diagram illustrating the flow of a style registration process.

Here, the flow of a style registration process will be described with reference to FIG. 16. FIG. 16 is a diagram illustrating the flow of a style registration process. As illustrated in FIG. 16, the content and position acquisition unit 161 acquires two or more electronic files or system screens in order to acquire a plurality of ledger sheets having the same layout and acquires the positions of columns in the plurality of ledger sheets having the same layout.

The column type discrimination unit 162 performs discrimination similarly to the first embodiment and then refers to the basic dictionary further to discriminates the type of a column as an item value when the content of the column is registered in the basic dictionary as a word that is not an item name.

Similarly to the first embodiment, when the discrimination information 165*b* is corrected, the correction unit 163 corrects the discrimination information 165*b* according to a user's instruction. After that, the registration unit 164 stores the discrimination information included in each ledger sheet in The style storage unit 166 for respective styles of the ledger sheet using the corrected discrimination information. When the discrimination information 165*b* is not corrected, the registration unit 164 stores the discrimination information included in each ledger sheet in the style storage unit 166 for respective styles of the ledger sheet using the discrimination information as it is.

The registration unit 164 adds the content of a column discriminated as an item name during style registration in the basic dictionary storage unit 169 as a word that is an item name in the basic dictionary. The registration unit 164 adds the content of a column discriminated not to be an item name via the correction unit 163 to the basic dictionary storage unit 169 as a word that is not an item name in the basic dictionary.

Figure 17:
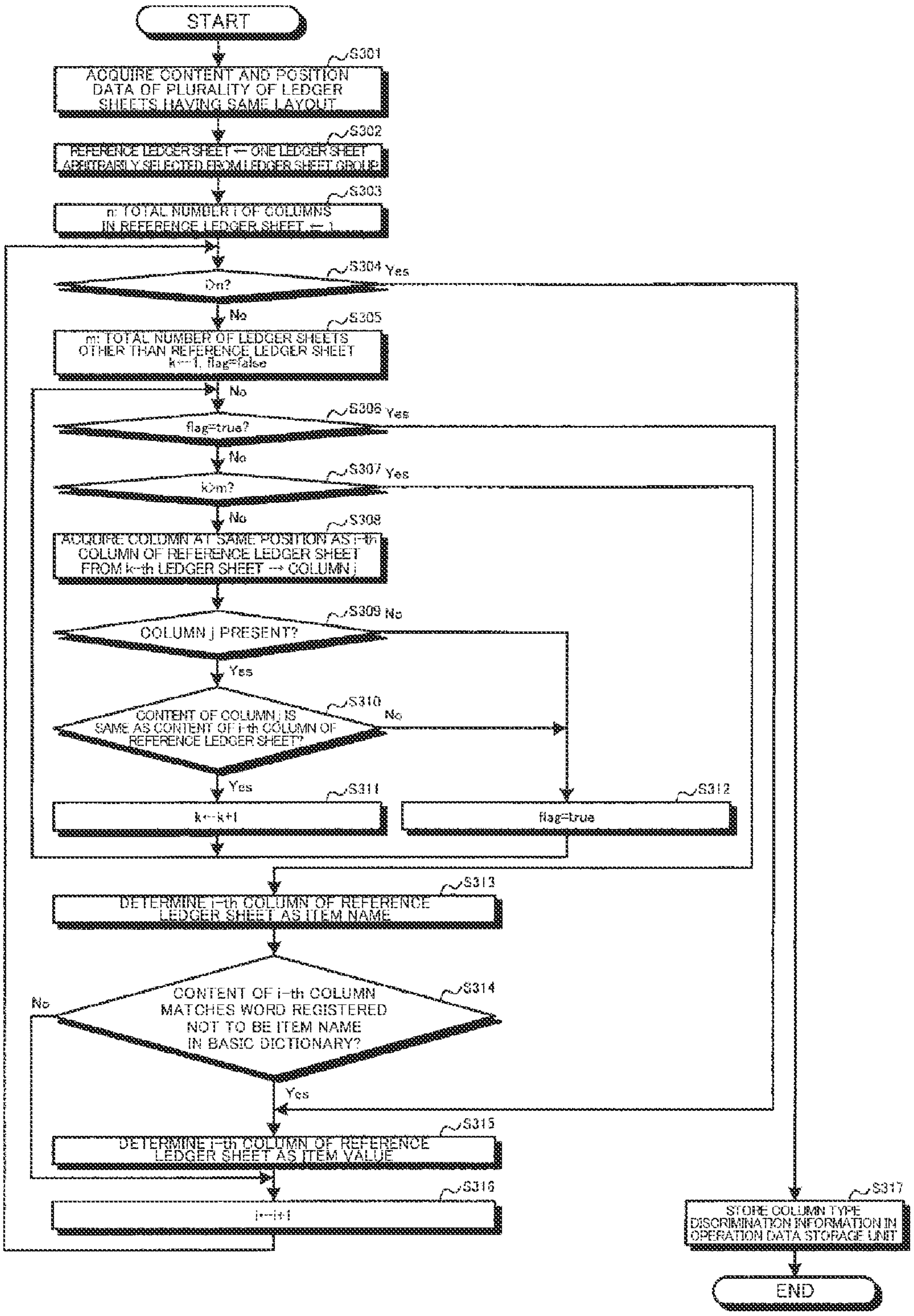
FIG. 17 is a flowchart illustrating an example of the flow of a process of registering discrimination information in an information processing device according to a modified example of the first embodiment.
Figure 18:
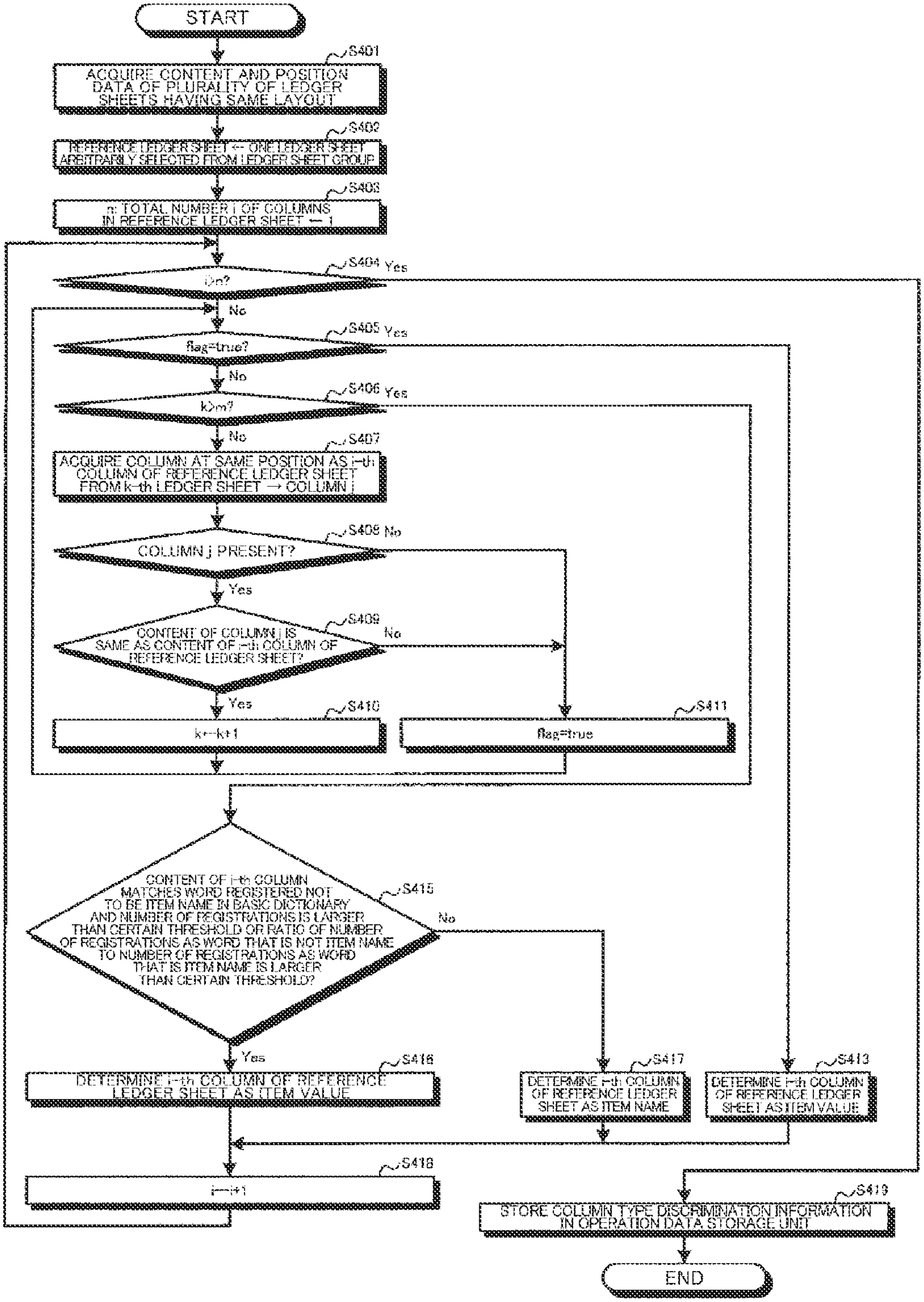
FIG. 18 is a flowchart illustrating an example of the flow of a process of registering discrimination information in an information processing device according to a modified example of the first embodiment.
Figure 19:
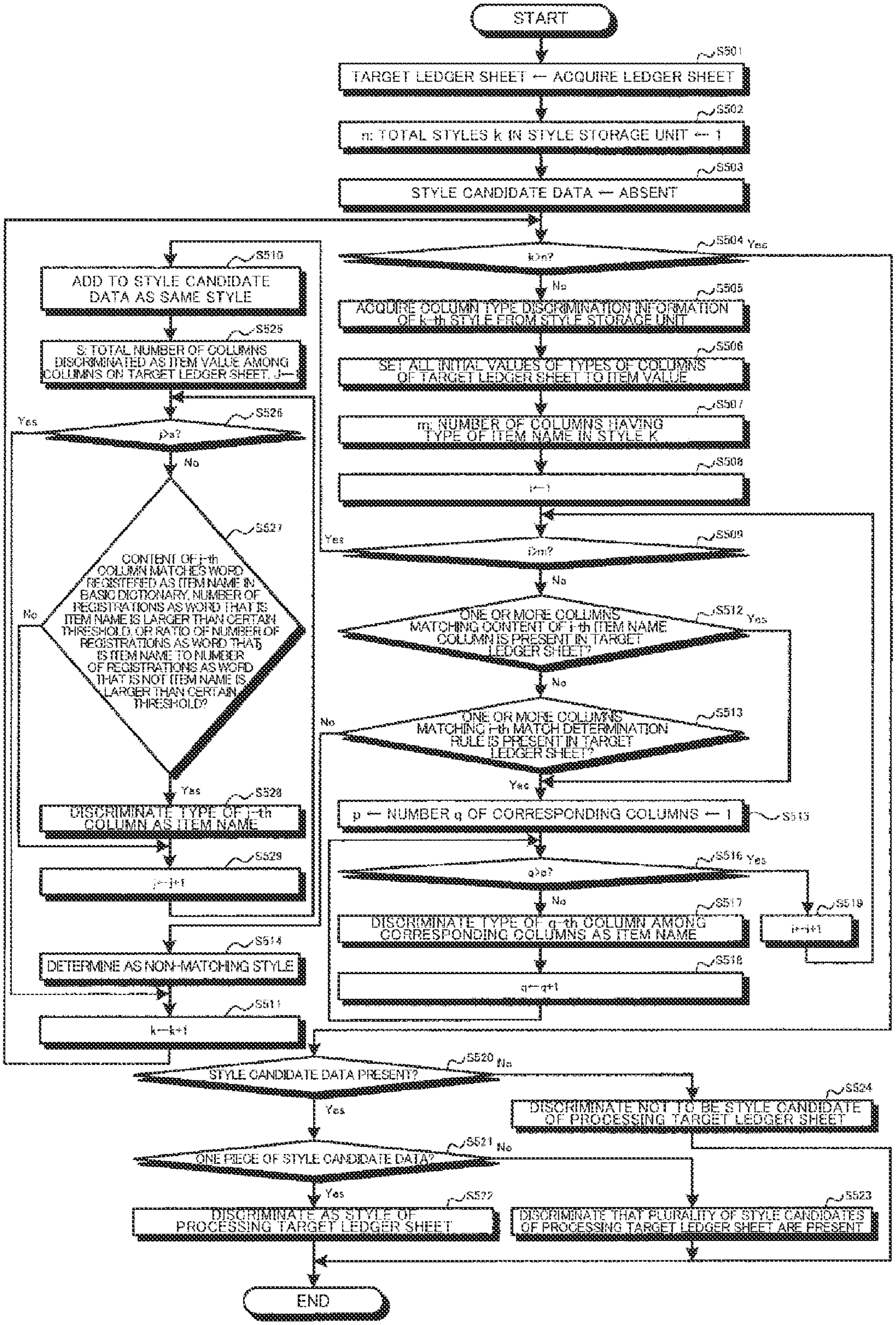
FIG. 19 is a flowchart illustrating an example of the flow of a process of determining the style of a ledger sheet in an information processing device according to a modified example of the first embodiment.

Next, an example of the processing procedure of the column type discrimination unit 162 of the information processing device 10 according to the modified example of the first embodiment will be described with reference to FIGS. 17 to 19. FIGS. 17 and 18 are flowcharts illustrating an example of the flow of a process of creating and registering column type discrimination information in the column type discrimination unit 162 of the information processing device according to the modified example of the first embodiment. FIG. 19 is a flowchart illustrating an example of the flow of a process of discriminating the type of a column and specifying the style candidate of a ledger sheet in the column type discrimination unit 162 of the information processing device according to the modified example of the first embodiment.

First, the flow of a process of creating and registering column type discrimination information using two or more ledger sheets having the same layout will be described with reference to FIG. 17. As illustrated in FIG. 17, the column type discrimination unit 162 acquires the content and position data of a plurality of ledger sheets having the same layout (step S301) and sets a ledger sheet arbitrarily selected from the acquired ledger sheet group as a reference ledger sheet (step S302). The column type discrimination unit 162 sets a total number of columns in the reference ledger sheet as n and sets the value of "1" to i (step S303).

Subsequently, the column type discrimination unit 162 determines whether the value of i is larger than the value of n (step S304). When the value of i is not larger than the value of n (step S304: No), the column type discrimination unit 162 sets a total number of ledger sheets other than the reference ledger sheet as m, sets "1" to k, and sets a flag to "false" (step S305).

The column type discrimination unit 162 determines whether the flag is "true" (step S306). When the flag is not "true" (step S306: No), the column type discrimination unit 162 determines whether the value of k is larger than the value of m (step S307). When the value of k is not larger than the value of m (step S307: No), the column type discrimination unit 162 acquires a column at the same position as an i-th column of the reference ledger sheet from a k-th ledger sheet as a column j (step S308).

The column type discrimination unit 162 determines whether the column j is present (step S309). When the column j is present (step S309: Yes), the column type discrimination unit 162 determines whether the content of the column j is the same as that of the i-th column of the reference ledger sheet (step S310). When it is determined that the content of the column j is the same as that of the i-th column of the reference ledger sheet (step S310: Yes), the column type discrimination unit 162 adds "1" to the value of k (step S311) and the flow returns to step S306. When the column j is not present (step S309: No), or it is determined that, although the column j is present, the content of the column j is not the same as that of the i-th column of the reference ledger sheet (step S310: No), the column type discrimination unit 162 sets the flag to "true" (step S312) and the flow returns to step S306.

In the process of step S306, when the flag is "true" (step S306: Yes), the column type discrimination unit 162 determines the i-th column of the reference ledger sheet as an item value (step S315) and adds "1" to the value of i (step S316), and the flow returns to step S304.

In the process of step S307, when the value of k is larger than the value of m (step S307: Yes), the column type discrimination unit 162 determines the i-th column of the reference ledger sheet as an item name (step S313). The column type discrimination unit 162 determines whether the content of the i-th column matches the word registered not to be an item name in the basic dictionary (step S314). When it is determined that the content of the i-th column matches the word registered not to be an item name in the basic dictionary (step S314: Yes), the column type discrimination unit 162 determines the i-th column of the reference ledger sheet as an item value (step S315) and adds "1" to the value of i (step S316), and the flow returns to step S304. When it is determined that the content does not match the word registered not to be an item name in the basic dictionary (step S314: No), the column type discrimination unit 162 adds "1" to the value of i (step S316), and the flow returns to step S304.

When it is determined in step S304 that the value of i is larger than the value of n (step S304: Yes), the column type discrimination unit 162 stores the column type discrimination information in the operation data storage unit 165 (step S317).

Next, a case of discriminating whether a column is an item name or an item value according to the registration history included in the basic dictionary will be described with reference to FIG. 18. As illustrated in FIG. 18, the column type discrimination unit 162 acquires the content and position data of a plurality of ledger sheets having the same layout from the operation data storage unit 165 (step S401) and sets a ledger sheet arbitrarily selected from the acquired ledger sheet group as a reference ledger sheet (step S402). The column type discrimination unit 162 sets a total number of columns in the reference ledger sheet as n and sets the value of "1" to i (step S403).

The column type discrimination unit 162 determines whether the value of i is larger than the value of n (step S404). When the value of i is not larger than the value of n (step S404: No), similarly to the first embodiment, the column type discrimination unit 162 sets a total number of ledger sheets other than the reference ledger sheet as m, sets "1" to k, sets a flag to "false", and determines whether the flag is "true" (step S405). When the flag is not "true" (step S405: No), the column type discrimination unit 162 determines whether the value of k is larger than the value of m (step S406). When the value of k is not larger than the value of m (step S406: No), the column type discrimination unit 162 acquires a column at the same position as an i-th column of the reference ledger sheet from a k-th ledger sheet as a column j (step S407).

The column type discrimination unit 162 determines whether the column j is present (step S408). When the column j is present (step S408: Yes), the column type discrimination unit 162 determines whether the content of the column j is the same as that of the i-th column of the reference ledger sheet (step S409). When it is determined that the content of the column j is the same as that of the i-th column of the reference ledger sheet (step S409: Yes), the column type discrimination unit 162 adds "1" to the value of k (step S410) and the flow returns to step S405. When the column j is not present (step S408: No), or it is determined that, although the column j is present, the content of the column j is not the same as that of the i-th column of the reference ledger sheet (step S409: No), the column type discrimination unit 162 sets the flag to "true" (step S411) and the flow returns to step S405.

In the process of step S406, when the value of k is larger than the value of m (step S406: Yes), the column type discrimination unit 162 determines whether the content of the i-th column matches the word registered not to be an item name in the basic dictionary and the number of registrations is larger than a certain threshold or the ratio of the number of registrations as a word that is not an item name to the number of registrations as a word that is an item name is larger than a certain threshold (step S415). When the number of registrations or the ratio of the number of registrations is larger than the threshold (step S415: Yes), the column type discrimination unit 162 discriminates the i-th column of the reference ledger sheet as an item value (step S416) and adds "1" to the value of i (step S418) and the flow returns to step S404.

When the number of registrations or the ratio of the number of registrations is not larger than the threshold (step S415: No), the column type discrimination unit 162 determines the i-th column of the reference ledger sheet as an item name (step S417) and adds "1" to the value of i (step S418), and the flow returns to step S404.

In the process of step S405, when the flag is "true" (step S405: Yes), the column type discrimination unit 162 determines the i-th column of the reference ledger sheet as an item value (step S413) and adds "1" to the value of i (step S418), and the flow returns to step S404.

When it is determined in step S404 that the value of i is larger than the value of n (step S404: Yes), the column type discrimination unit 162 stores the column type discrimination information in the operation data storage unit 165 (step S419).

Next, the flow of the process of discriminating the type of a column of a ledger sheet and specifying style candidates using the registered column type discrimination information will be described with reference to FIG. 19. As illustrated in FIG. 19, the column type discrimination unit 162 acquires the content and position data of an acquired ledger sheet as a target ledger sheet (step S501), sets a total number of styles in the style storage unit 166 as the value of n and sets the value of "1" to k (step S502). The column type discrimination unit 162 sets "absent" to style candidate data (step S503) and determines whether k is larger than n (step S504).

Subsequently, when k is not larger than n (step S504: No), the column type discrimination unit 162 acquires column type discrimination information of a k-th style from the style storage unit 166 (step S505) and sets all the initial values of the types of columns of the target ledger sheet to an item value (step S506). The column type discrimination unit 162 sets the number m of columns having the type of an item name in the style k (step S507) and sets the value of "1" to i (step S508).

Subsequently, the column type discrimination unit 162 determines whether the value of i is larger than the value of m (step S509). When the value of i is not larger than the value of m (step S509: No), the column type discrimination unit 162 determines whether at least one column matching the content of an i-th item name column is present in the target ledger sheet (step S512). When at least one column matching the content of the i-th item name column is not present (step S512: No), the column type discrimination unit 162 determines whether at least one column matching an i-th match determination rule is present in the target ledger sheet (step S513). When at least one column matching the i-th match determination rule is not present in the target ledger sheet (step S513: No), the column type discrimination unit 162 determines that the style does not match (step S514) and the flow proceeds to step S511.

When at least one column matching the i-th match determination rule is present in the target ledger sheet (step S513: Yes), the column type discrimination unit 162 proceeds to step S515. When it is determined in step S512 that at least one column matching the content of the i-th item name column is present (step S512: Yes), the column type discrimination unit 162 proceeds to step S515.

In step S515, the column type discrimination unit 162 sets the number of the corresponding columns (that is, the columns matching the content of the i-th item name column or the match determination rule) to p and sets the value of "1" to q (step S515). The column type discrimination unit 162 determines whether the value of q is larger than the value of p (step S516). When the value of q is not larger than the value of p (step S516: No), the column type discrimination unit 162 discriminates the type of a q-th column among the columns as an item name (step S517) and adds "1" to the value of q (step S518), and the flow returns to step S516.

When it is determined in step S516 that the value of q is larger than the value of p (step S516: Yes), the column type discrimination unit 162 adds "1" to the value of i (step S519), and the flow returns to step S509.

When it is determined in step S509 that the value of i is larger than the value of m (step S509: Yes), the column type discrimination unit 162 adds the style to the style candidate data as the same style (step S510), sets the total number of columns discriminated to be an item name of the column of the target leger sheet as s, and sets "1" to j (step S525).

The column type discrimination unit 162 determines whether j is larger than s (step S526). When j is larger than s (step S526: Yes), the flow proceeds to step S511. When j is not larger than s (step S526: No), the column type discrimination unit 162 determines whether the content of the j-th column matches the word registered as an item name in the basic dictionary, the number of registrations as a word that is an item name is larger than a certain threshold, or the ratio of the number of registrations as a word that is an item name to the number of registrations as a word that is not an item name is larger than a certain threshold (step S527).

When the content of the j-th column does not match the word registered as an item name in the basic dictionary or the number of registrations or the ratio of the number of registrations is not larger than the threshold (step S527: No), the column type discrimination unit 162 proceeds to step S529. When the content of the j-th column matches the word registered as an item name in the basic dictionary or the number of registrations or the ratio of the number of registrations is larger than the threshold (step S527: Yes), the column type discrimination unit 162 discriminates the type of the j-th column as an item name (step S528) and the flow proceeds to step S529. In step S529, the column type discrimination unit 162 adds "1" to the value of j (step S529) and the flow returns to step S526. In step S511, the column type discrimination unit 162 adds "1" to the value of k (step S511), and the flow returns to step S504.

When it is determined in step S504 that the value of k is larger than the value of n (step S504: Yes), the column type discrimination unit 162 determines whether style candidate data is present (step S520). When the style candidate data is present (step S520: Yes), the column type discrimination unit 162 determines whether the number of pieces of style candidates is 1 (step S521).

When the number of pieces of style candidate data is 1 (step S521: Yes), the column type discrimination unit 162 discriminates the style candidate data as the style of the processing target ledger sheet (step S522).

When the number of pieces of style candidate data is not 1 (step S521: No), the column type discrimination unit 162 determines that there are a number of pieces of style candidates of the processing target ledger sheet (step S523). When it is determined in step S520 that the style candidate data is not present (step S520: No), the column type discrimination unit 162 determines that the style candidate of the processing target ledger sheet is not present (step S524).

As described above, in the information processing device 10 according to the modified example of the first embodiment, a word discriminated as an item name and a word discriminated not to be an item name after correction, and the registration history thereof are registered in the basic dictionary. Due to this, in the information processing device 10, for example, when the type of a column of a ledger sheet is discriminated using the information on a registered style, an item name column which is erroneously discriminated as an item value on the basis of comparison with the column type discrimination information of the style because an item which was not present during registration of styles is added to a processing target ledger sheet is corrected by referring to the basic dictionary, whereby the column can be discriminated as an item name correctly. When the style of another ledger sheet is registered, an item value column which is erroneously discriminated as an item name because there are a few sample ledger sheets having the same layout and the contents at the same position match is corrected by referring to the basic dictionary, whereby the column can be discriminated as an item value correctly.

Second Embodiment

In the information processing device 10 according to the first embodiment, a case of storing and using an item name or a match determination rule as column type discrimination information has been described. However, the column type discrimination information is not limited thereto. A relationship between item names corresponding to an item value on a ledger sheet (for example, a relationship that an item name of "name" and an item name of "furigana" are item names of the same item value of "NTT taro", and an item name of "name" and an item name " furigana" are in a parent-child relation) may be stored and used as column type discrimination information. Hereinafter, a case in which a relation recognition unit 170 recognizes a relationship between item names in a ledger sheet and uses the recognition result will be described as the second embodiment. The description of the same configuration and the processing as those of the first embodiment will be omitted appropriately.

Figure 20:
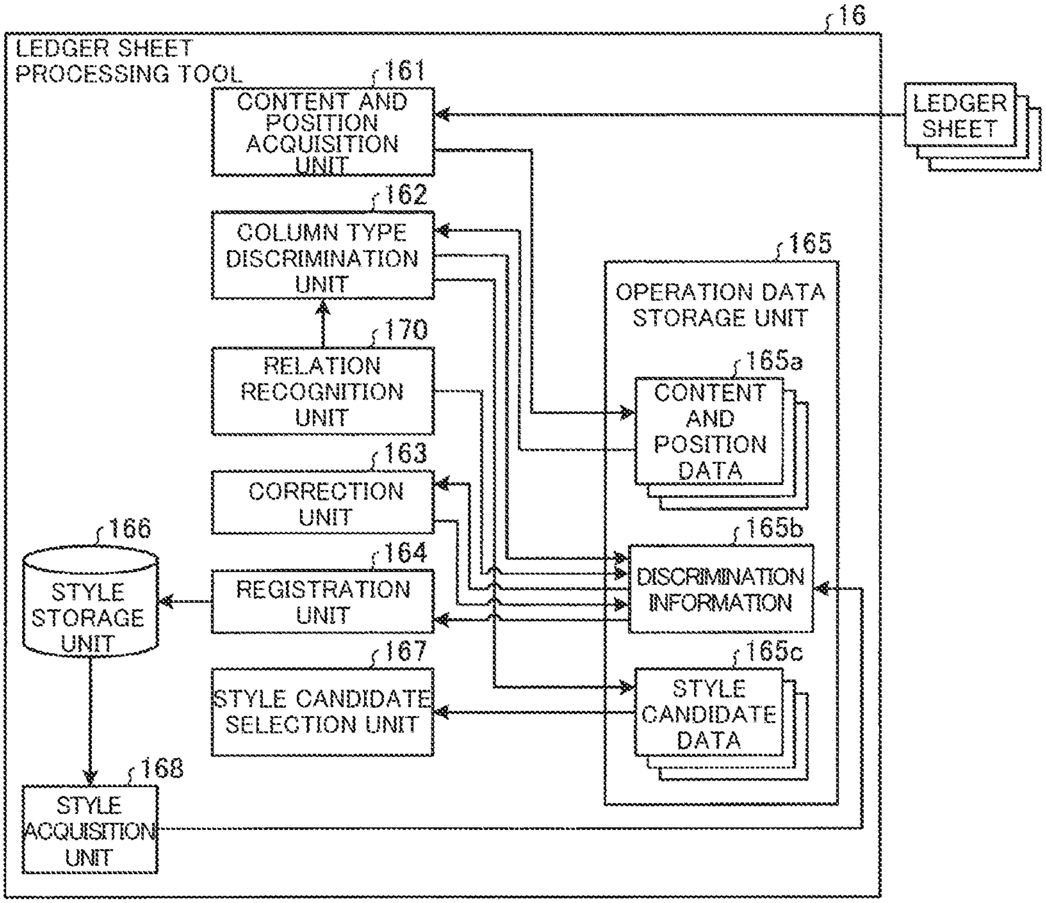
FIG. 20 is a block diagram illustrating a logical configuration of a ledger sheet processing tool in an information processing device according to a second embodiment.

FIG. 20 is a block diagram illustrating a logical configuration of a ledger sheet processing tool in an information processing device according to the second embodiment. As illustrated in FIG. 20, the ledger sheet processing tool 16 further includes the relation recognition unit 170.

The relation recognition unit 170 specifies one or a plurality of item names corresponding to each item value in a style registration target ledger sheet, derives a relationship between the item names as conditions to be satisfied by an item name in the style of the ledger sheet, and stores the conditions in the operation data storage unit 165 as column type discrimination information. For example, the relation recognition unit 170 specifies one or more item name columns corresponding to an item value column and a relation between the item name columns from the item names discriminated by the column type discrimination unit 162 according to predetermined conditions and stores the item names and the relationship in the operation data storage unit 165 as the discrimination information **165*b*. A method of recognizing the correspondence between an item name column and an item value column and the relation between item name columns is not particularly limited, and the conditions for specifying the correspondence between an item value column and an item name column and the relation between item name columns may be changed appropriately. Moreover, the relation recognition unit 170 may recognize the relation between an item value and an item name in a ledger sheet and store the relation between an item value and an item name in the operation data storage unit 165**.

Here, the relationship between item names corresponding to an item value on a ledger sheet will be described with reference to FIG. 21. FIG. 21 is a diagram illustrating an example of a relationship between item names corresponding to an item value on a ledger sheet. The example of FIG. 21 is a relationship between item names corresponding to each item value specified from the ledger sheet illustrated in FIG. 5, and in this example, a parent-child relation is described in the order of parent→child. For example, when item names corresponding to an item value of "NTT taro" in FIG. 5 are obtained as "contract information", "name", and "furigana" in the order of parent→child, the operation data storage unit 165 stores "contractor information", "name", and "furigana" in the column type discrimination information **165*b*** as item names. The relationship between item names corresponding to an item value column on a ledger sheet is not limited to the parent-child relation between item names.

Here, the flow of a style registration process in the second embodiment will be described. In the second embodiment, similarly to the first embodiment, after the registration unit 164 stores the column type discrimination information in the style storage unit 166, the relation recognition unit 170 specifies one or more item name columns corresponding to an item value column and the relation between the item name columns from the item names discriminated by the column type discrimination unit 162 according to predetermined conditions and stores the item names and the relationship in the operation data storage unit 165 as the discrimination information **165*b*. The flow of the detailed processes will be described in detail with reference to FIG. 23** later.

Figure 22:
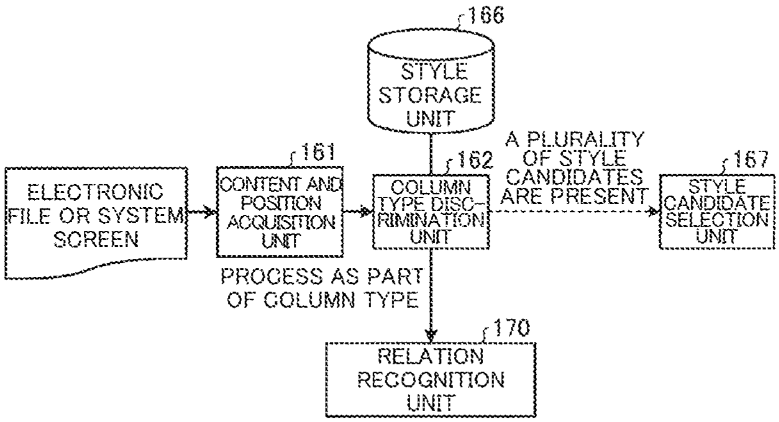
FIG. 22 is a diagram illustrating the flow of a process of discriminating the type of a column of a ledger sheet and specifying a style candidate of the ledger sheet.

Next, the flow when the type of a column of a ledger sheet is discriminated using the information on the registered style will be described with reference to FIG. 22. FIG. 22 is a diagram illustrating the flow of a process of discriminating the type of a column of a ledger sheet and specifying style candidates of the ledger sheet. As illustrated in FIG. 22, the content and position acquisition unit 161 acquires a processing target ledger sheet from an electronic file or a system screen and acquires the content and the position of each column in the ledger sheet.

The column type discrimination unit 162 discriminates the type of a column of the processing target ledger sheet, determines whether an item name in the processing target ledger sheet satisfies the relationship between item names described in the column type discrimination information, determines whether an item name described in the column type discrimination information corresponds to a certain item name column in the processing target ledger sheet according to the determination result, and specifies style candidates of the processing target ledger sheet. Specifically, the column type discrimination unit 162 discriminates, according to the result of the comparison which will be described below, the type of each column of the processing target ledger sheet according to the comparison result, and specifies the style candidates of the processing target ledger sheet. Here, in the comparison, the column type discrimination unit 162 compares the relationship between an item name and the content of each column of the input processing target ledger sheet and the relationship information of the item name and the column type discrimination information of the style stored in the style storage unit 166 and the acquired by the style acquisition unit 168. Here, the relation recognition unit 170 discriminates the type of each column in the processing target ledger sheet according to the first embodiment as a part of the column type discrimination unit 162 and then recognizes the relationship between the item names in the ledger sheet. The column type discrimination unit 162 specifies the style candidates of the processing target ledger sheet depending on the situation described below with respect to each of the item names included in the column type discrimination information of each of the registered styles and the match determination rules thereof determined in the first embodiment. Here, the situation means whether a relationship matching the relationship between the item names of each of the registered styles is present in the relationship between the item names in the processing target ledger sheet as well as whether a matching column is present in the processing target ledger sheet. That is, in the second embodiment, the column type discrimination unit 162 compares the relationship of the item names correlated with an item value as well as the contents of each column and specifies the style candidates of the processing target ledger sheet according to the comparison result.

Figure 23:
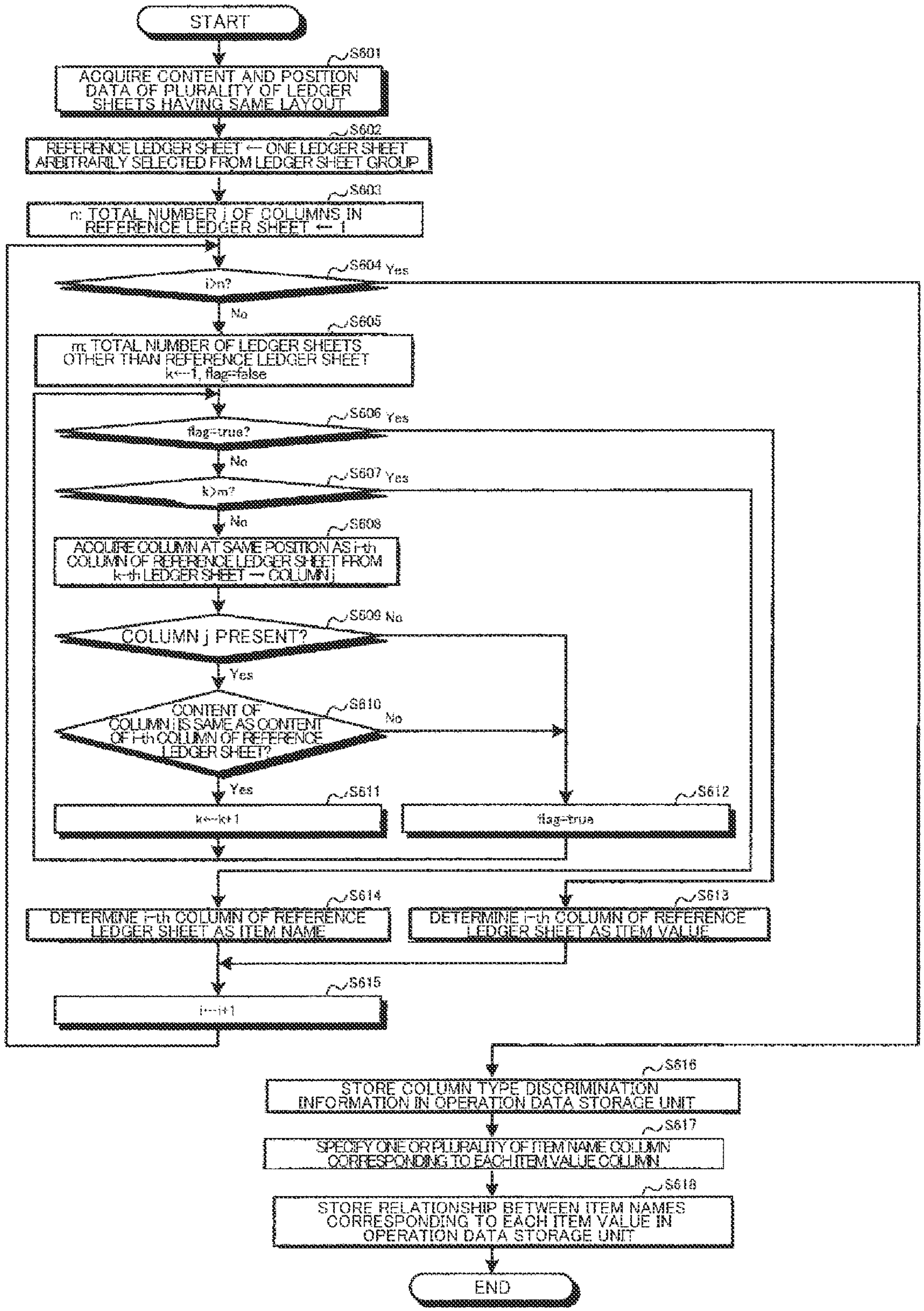
FIG. 23 is a flowchart illustrating an example of the flow or a process of registering discrimination information in the information processing device according to the second embodiment.
Figure 24:
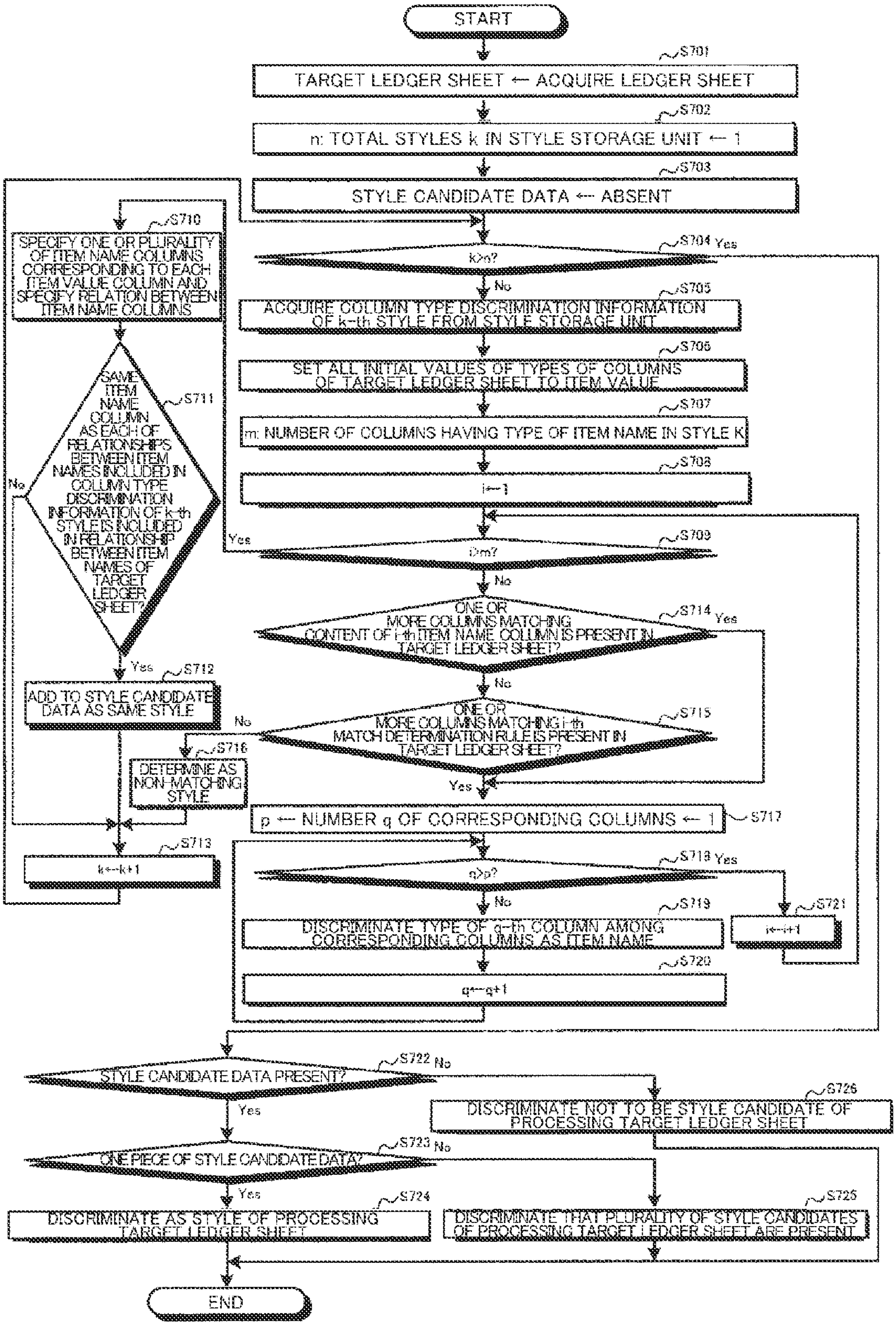
FIG. 24 is a flowchart illustrating an example of the flow of a process of determining the style of a ledger sheet in the information processing device according to the second embodiment.

Next, an example of the processing procedure of the relation recognition unit 170 and the column type discrimination unit 162 of the information processing device 10 according to the second embodiment will be described with reference to FIGS. 23 and 24. FIG. 23 is a flowchart illustrating an example of the flow of a process of creating and registering the column type discrimination information in the relation recognition unit 170 and the column type discrimination unit 162 of the information processing device according to the second embodiment. FIG. 24 is a flowchart illustrating an example of the flow of a process of discriminating the type of a column and specifying style candidates of a ledger sheet in the relation recognition unit 170 and the column type discrimination unit 162 of the information processing device according to the second embodiment.

First, the flow of a process of creating and registering the column type discrimination information using two or more ledger sheets having the same layout will be described with reference to FIG. 23. As illustrated in FIG. 23, the column type discrimination unit 162 acquires the content and position data of a plurality of ledger sheets having the same layout (step S601) and selects an arbitrary ledger sheet from the acquired ledger sheet group as a reference ledger sheet (step S602). The column type discrimination unit 162 sets a total number of columns in the reference ledger sheet as n and sets the value of "1" to i (step S603).

Subsequently, the column type discrimination unit 162 determines whether the value of i is larger than the value of n (step S604). When the value of is not larger than the value of n (step S604: No), the column type discrimination unit 162 sets a total number of ledger sheets other than the reference ledger sheet as m, sets "1" to k, and sets a flag to "false" (step S605).

The column type discrimination unit 162 determines whether the flag is "true" (step S606). When the flag is not "true" (step S606: No), the column type discrimination unit 162 determines whether the value of k is larger than the value of m (step S607). When the value of k is not larger than the value of m (step S607: No), the column type discrimination unit 162 acquires a column at the same position as an i-th column of the reference ledger sheet from a k-th ledger sheet as a column j (step S608).

The column type discrimination unit 162 determines whether the column j is present (step S609). When the column j is present (step S609: Yes), the column type discrimination unit 162 determines whether the content of the column j is the same as that of the i-th column of the reference ledger sheet (step S610). When it is determined that the content of the column j is the same as that of the i-th column of the reference ledger sheet (step S610: Yes), the column type discrimination unit 162 adds "1" to the value of k (step S611) and the flow returns to step S606. When the column j is not present (step S609: No), or it is determined that, although the column j is present, the content of the column j is not the same as that of the i-th column of the reference ledger sheet (step S610: No), the column type discrimination unit 162 sets the flag to "true" (step S612) and the flow returns to step S606.

In the process of step S607, when the value of k is larger than the value of m (step S607: Yes), the column type discrimination unit 162 determines the i-th column of the reference ledger sheet as an item name (step S614) and adds "1" to the value of i (step S615), and the flow returns to step S604.

In the process of step S606, when the flag is "true" (step S606: Yes), the column type discrimination unit 162 determines the i-th column of the reference ledger sheet as an item value (step S613) and adds "1" to the value of i (step S615), and the flow returns to step S604.

When it is determined in step S604 that the value of i is larger than the value of n (step S604: Yes), the column type discrimination unit 162 stores the column type discrimination information in the operation data storage unit 165 (step S616).

The column type discrimination unit 162 specifies one or a plurality of item name columns corresponding to each item value column in the ledger sheet with the aid of the relation recognition unit 170 (step S617) and stores the relationship between the item names corresponding to each item value in the operation data storage unit 165 as the column type discrimination information (step S618).

Next, the flow of a process of discriminating the type of a column of a ledger sheet and specifying a style candidate using the registered column type discrimination information will be described with reference to FIG. 24. As illustrated in FIG. 24, the column type discrimination unit 162 acquires the content and position data of an acquired ledger sheet as a target ledger sheet (step S701), sets a total number of styles in the style storage unit 166 as the value of k and sets the value of "1" to k (step S702). The column type discrimination unit 162 sets "absent" to style candidate data (step S703) and determines whether k larger than n (step S704).

Subsequently, when k is not larger than n (step S704: No), the column type discrimination unit 162 acquires column type discrimination information of a k-th style from the style storage unit 166 (step S705) and sets all the initial values of the types of columns of the target ledger sheet to an item value (step S706). The column type discrimination unit 162 sets the number m of columns having the type of an item name in the style k (step S707) and sets the value of "1" to i (step S708).

Subsequently, the column type discrimination unit 162 determines whether the value of i is larger than the value of m (step S709). When the value of i is not larger than the value of m (step S709: No), the column type discrimination unit 162 determines whether at least one column matching the content of an i-th item name column is present in the target ledger sheet (step S714). When at least one column matching the content of the i-th item name column is not present (step S714: No), the column type discrimination unit 162 determines whether at least one column matching an i-th match determination rule is present in the target ledger sheet (step S715). When at least one column matching the i-th match determination rule is not present in the target ledger sheet (step S715: No), the column type discrimination unit 162 determines that the style does not match (step S716) and the flow proceeds to step S713.

When at least one column matching the i-th match determination rule is present in the target ledger sheet (step S715: Yes), the column type discrimination unit 162 proceeds to step S717. When it is determined in step S714 that at least one column matching the content of the i-th item name column is present (step S714: Yes), the column type discrimination unit 162 proceeds to step S717.

In step S717, the column type discrimination unit 162 sets the number of the corresponding columns (that is, the columns matching the content of the i-th item name column or the match determination rule) to p and sets the value of "1" to q (step S717). The column type discrimination unit 162 determines whether the value of q is larger than the value of p (step S718). When the value of q is not larger than the value of p (step S718: No), the column type discrimination unit 162 discriminates the type of a p-th column among the columns as an item name (step S719) and adds "1" to the value of q (step S720), and the flow returns to step S718.

When it is determined in step S718 that the value of q is larger than the value of p (step S718: Yes), the column type discrimination unit 162 adds "1" to the value of i (step S721), and the flow returns to step S709.

When it is determined in step 5709 that the value of i is larger than the value of m (step S709: Yes), the column type discrimination unit 162 specifies one or a plurality of item name columns corresponding to each item value column in the ledger sheet and further specifies the relation between the item name columns with the aid of the relation recognition unit 170 (step S710). The column type discrimination unit 162 determines whether the same item name column as each of the relationships be the item names included in the column type discrimination information of the k-th style is included in the relationship between the item names of the target ledger sheet (step S711).

When it is determined that the same item name column as each of the relationships between the item names included in the column type discrimination information of the k-th style is included in the relationship between the item names of the target ledger sheet (step S711: Yes), the column type discrimination unit 162 adds the style to the style candidate data as the same style (step S712) and adds "1" to the value of k (step S713), and the flow returns to step S704. When it is determined that the same item name column as each of the relationships between the item names included in the column type discrimination information of the k-th style is not included in the relationship between the item names of the target ledger sheet (step S711: No), the column type discrimination unit 162 adds "1" to the value of k (step S713) and the flow returns to step S704.

When it is determined in step S704 that the value of k is larger than the value of n (step S704: Yes), the column type discrimination unit 162 determines whether style candidate data is present (step S722). When the style candidate data is present (step S722: Yes), the column type discrimination unit 162 determines whether the number of pieces of style candidates is 1 (step S723).

When the number of pieces of style candidate data is 1 (step S723: Yes), the column type discrimination unit 162 discriminates the style candidate data as the style of the processing target ledger sheet (step S724).

When the number of pieces of style candidate data is not 1 (step S723: No), the column type discrimination unit 162 determines that there are a number of pieces of style candidates of the processing target ledger sheet (step S725). When it is determined in step S722 that the style candidate data is not present (step S722: No), the column type discrimination unit 162 determines that the style candidate of the processing target ledger sheet is not present (step S726).

Effects of Second Embodiment

As described above, the information processing device 10 according to the second embodiment compares the item names corresponding to the item value stored as the column type discrimination information and the relationship between the item names and the item names corresponding to the item value column of the processing target ledger sheet and the relationship between the item names and discriminates that both are the same style when both are the same. Therefore, the information processing device 10 according to the second embodiment can discriminates the style of a processing target ledger sheet with higher accuracy by taking the relationship between item names correlated with an item value into consideration.

In the second embodiment, similarly to the modified example of the first embodiment, the type of a column may be discriminated as an item value when the content of the column is stored in a basic dictionary as a word that is not an item name by referring to the basic dictionary.

Third Embodiment

The content and position acquisition unit 161 of the information processing device 10 may recognize the content and the position of each column by optical character recognition in order to acquire the content and the position of each column in a ledger sheet. Hereinafter, a case of recognizing the content and the position of each column by optical character recognition will be described as a third embodiment.

Figure 25:
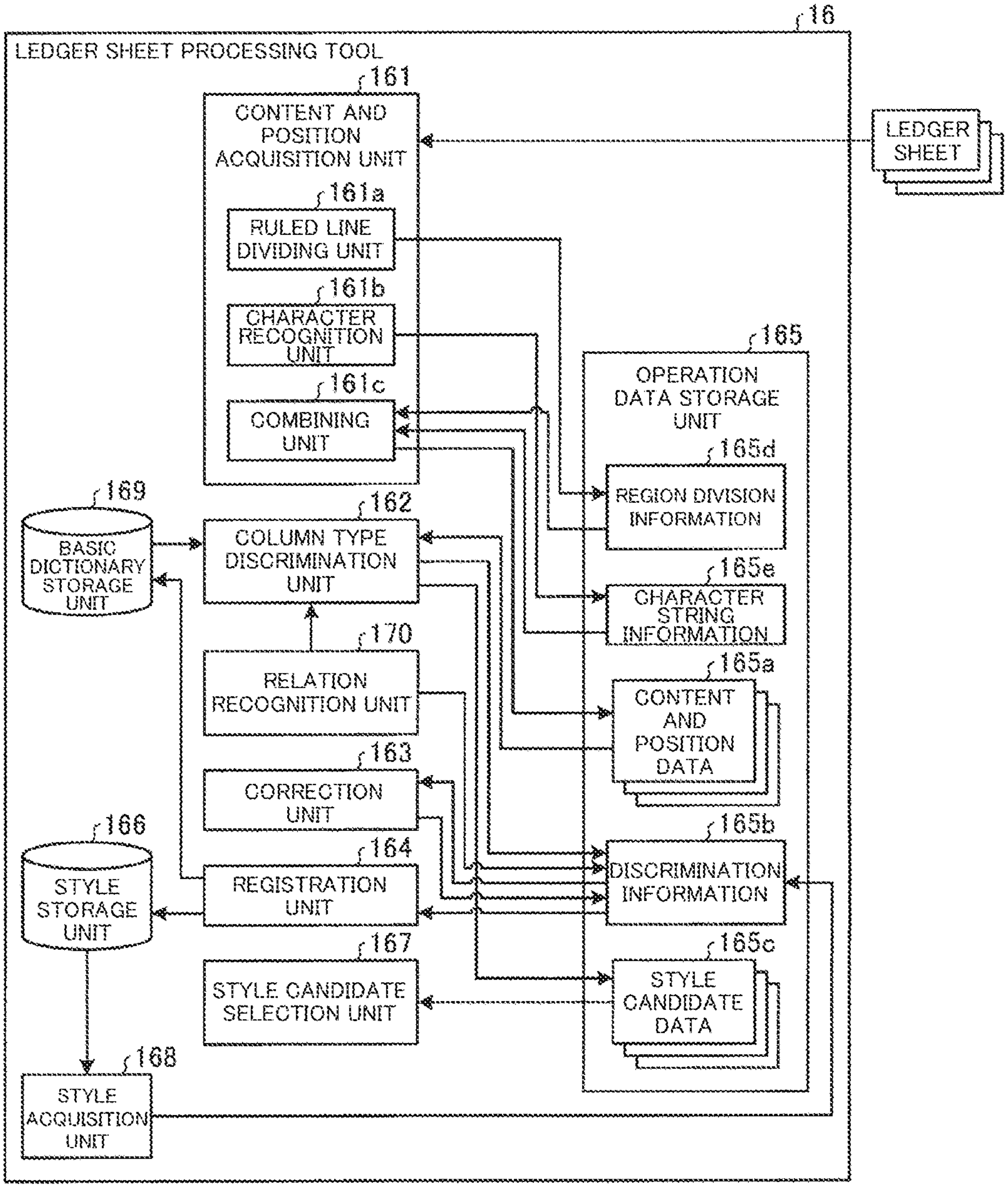
FIG. 25 is a block diagram illustrating a logical configuration of a ledger sheet processing tool in an information processing device according to a third embodiment.

FIG. 25 is a block diagram illustrating a logical configuration of a ledger sheet processing tool in an information processing device according to the third embodiment. As illustrated in FIG. 25, the content and position acquisition unit 161 includes a ruled line dividing unit 161*a*, a character recognition unit 161*b*, and a combining unit 161*c*. The content and position acquisition unit 161 obtains endpoint information of a ruled line from image data of a ledger sheet, acquires a region surrounded by the ruled line, acquires the region surrounded by the ruled line as the position of a single column, acquires a set of character strings present in the region of the single column acquired by optical character recognition as the content, and generates content and position data by combining the position and the content of the column.

The ruled line dividing unit 161*a* divides a region using ruled line information and stores information on the region in the operation data storage unit 165 as region division information 165*d*. The character recognition unit 161*b* recognizes the position and the content of each character string by optical character recognition with respect to the ledger sheet acquired as image data and stores the recognized position and content, of each character string in the operation data storage unit 165 as character string information 165*e*. The combining unit 161*c* regards each of the regions divided by the ruled line dividing unit 161*a* as a single column, finds all character strings in the region, and stores the set of character strings and the region division information in the operation data storage unit 165 as content and position data 165*a* in which a set of character strings is the content of the column and the region division information of the region is the position of the column.

Figure 26:
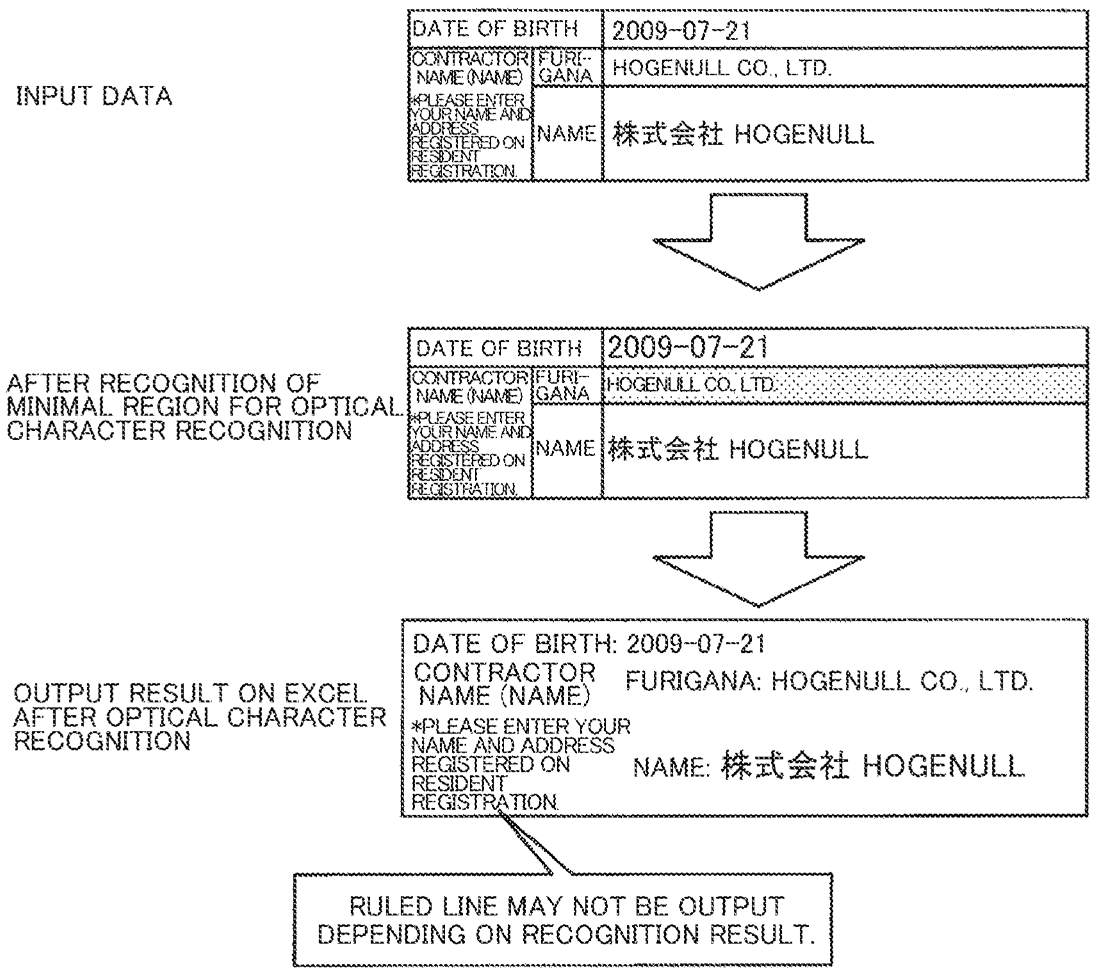
FIG. 26 is a diagram illustrating preprocessing performed on a ledger sheet acquired as image data.
Figure 27:
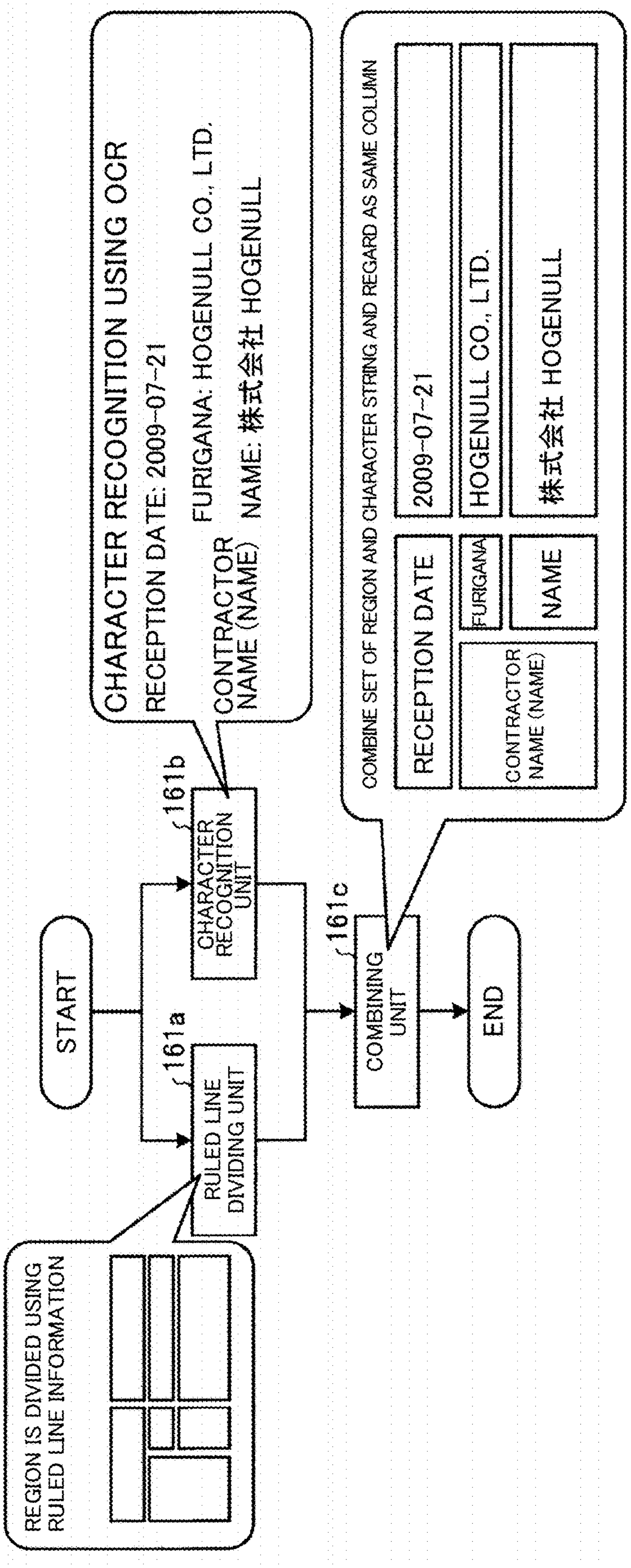
FIG. 27 is a diagram illustrating preprocessing performed on a ledger sheet acquired as image data.

Here, the process of the content and position acquisition unit 161 will be described with reference to FIGS. 26 and 27. First, an output example using optical character recognition software will be described with reference to the example of FIG. 26. As illustrated in FIG. 26, when data of a ledger sheet is acquired as input data, the content and position acquisition unit 161 recognizes a ruled line by image processing and acquires an endpoint position of the ruled line. Moreover, the content and position acquisition unit 161 identifies a character string by optical character recognition and acquires the character string and the presence region of the character string. The example of FIG. 26 is an example of an optical character recognition result, and only character strings are output.

Next, the flow of a series of processes of the content and position acquisition unit 161 will be described with reference to FIG. 27. As illustrated in FIG. 27, the ruled line dividing unit 161*a* acquires an endpoint position of a ruled line by image processing and then divides a region using the same. The character recognition unit 161*b* acquires character strings and the presence regions thereof by optical character recognition. The combining unit 161*c* finds all character strings present in each of the regions divided by the ruled line dividing unit 161*a* and generates content and position data of a column in which a set of character strings is the content of the column and the region division information thereof is the position of the column.

Figure 28:
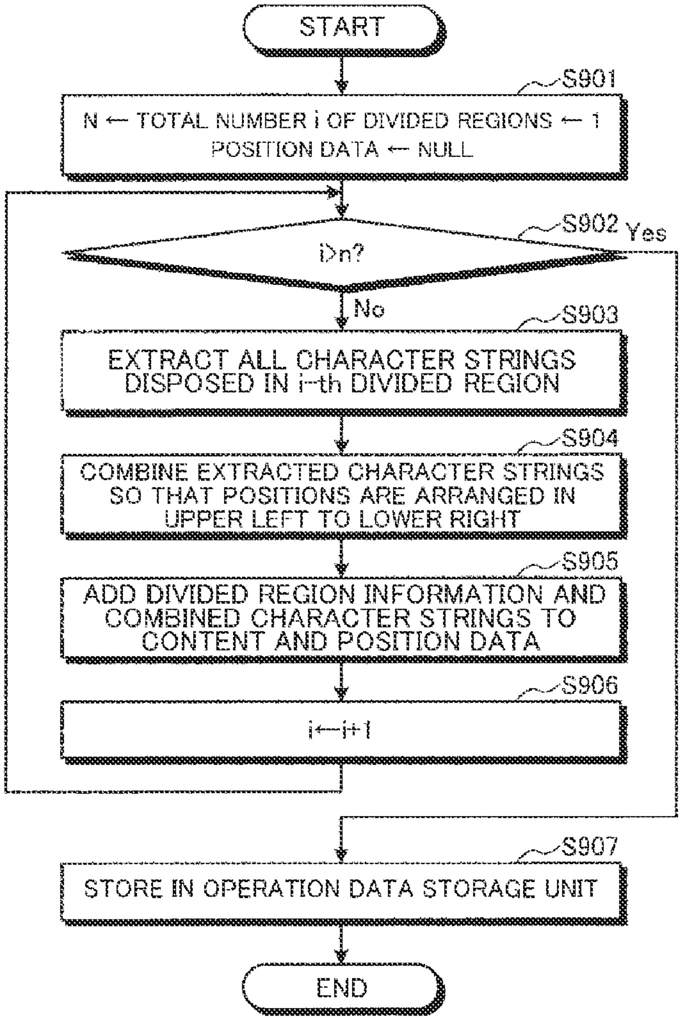
FIG. 28 is a flowchart illustrating an example of the flow of a process of registering content and position data in the information processing device according to the third embodiment.

Next, an example of the processing procedure of the combining unit 161*c* of the information processing device 10 according to the third embodiment will be described with reference to FIG. 28. FIG. 28 is a flowchart illustrating an example of the flow of a process of storing content and position data in the information processing device according to the third embodiment.

As illustrated in FIG. 28, the information processing device 10 sets a total number of divided regions as n, sets the value of "1" to i, and sets NULL to content and position data (step S901). The information processing device 10 determines whether the value of i is larger than the value of n (step S902).

When it is determined that the value of i is not larger than the value of n (step S902: No), the information processing device 10 extracts all character strings present in an i-th divided region (step S903), and combines the extracted character strings so that the positions of the character strings are arranged in the order from the lower left to the lower right (step S904).

The information processing device 10 adds the information on the divided region and the combined character string to the content and position data (step S905) and adds "1" to the value of i (step S906), and the flow returns to step S902. When it is determined in step S902 that the value of i is larger than the value of n (step S902: Yes), the information processing device 10 stores the content and position data 165*a* in the operation data storage unit 165 (step S907).

Effects of Third Embodiment

As described above, the information processing device 10 combines the results of dividing a region on the basis of the endpoint information of a ruled line acquired by image processing on a ledger sheet acquired as image data and character strings and the positions thereof acquired by optical character recognition as preprocessing and correlates the content and the position of each column to generate content and position data of each column whereby the type of each column can be discriminated automatically on the basis of the content and position data.

System Configuration And The Like

The components of the devices illustrated in the drawings are functionally conceptual and are not necessarily physically configured as illustrated in the drawings. In other words, the specific aspects of distribution and integration of the devices are not limited to those illustrated in the drawings. All or part of the components may be distributed or integrated functionally or physically in desired units depending on various kinds of loads and states of use, for example. All or desired part of the processing functions performed by the devices are provided by a CPU or a program analyzed and executed by the CPU or as hardware by wired logic.

All or part of the processing described as automatically performed processing out of the processing described in the present embodiment may be performed manually. Alternatively, all or part of the processing described as manually performed processing may be performed automatically by a known method. In addition, the processing procedures, the control procedures, the specific names, and the information including various kinds of data and parameters described in the present specification and the drawings can be optionally changed unless there is any special mention.

Program

A program that describes the processing executed by the information processing device described in the embodiment in a language executable by a computer may be created. For example, a discrimination program that describes the processing executed by the information processing device 10 according to the embodiment in a language executable by a computer may be created. In this case, the computer executes the discrimination program whereby the same effects as those of the embodiment can be obtained. Furthermore, the discrimination program may be recorded on a computer-readable recording medium, and the discrimination program recorded on the recording medium may be read and executed by the computer whereby the processing similar to that of the embodiment is realized.

Figure 29:
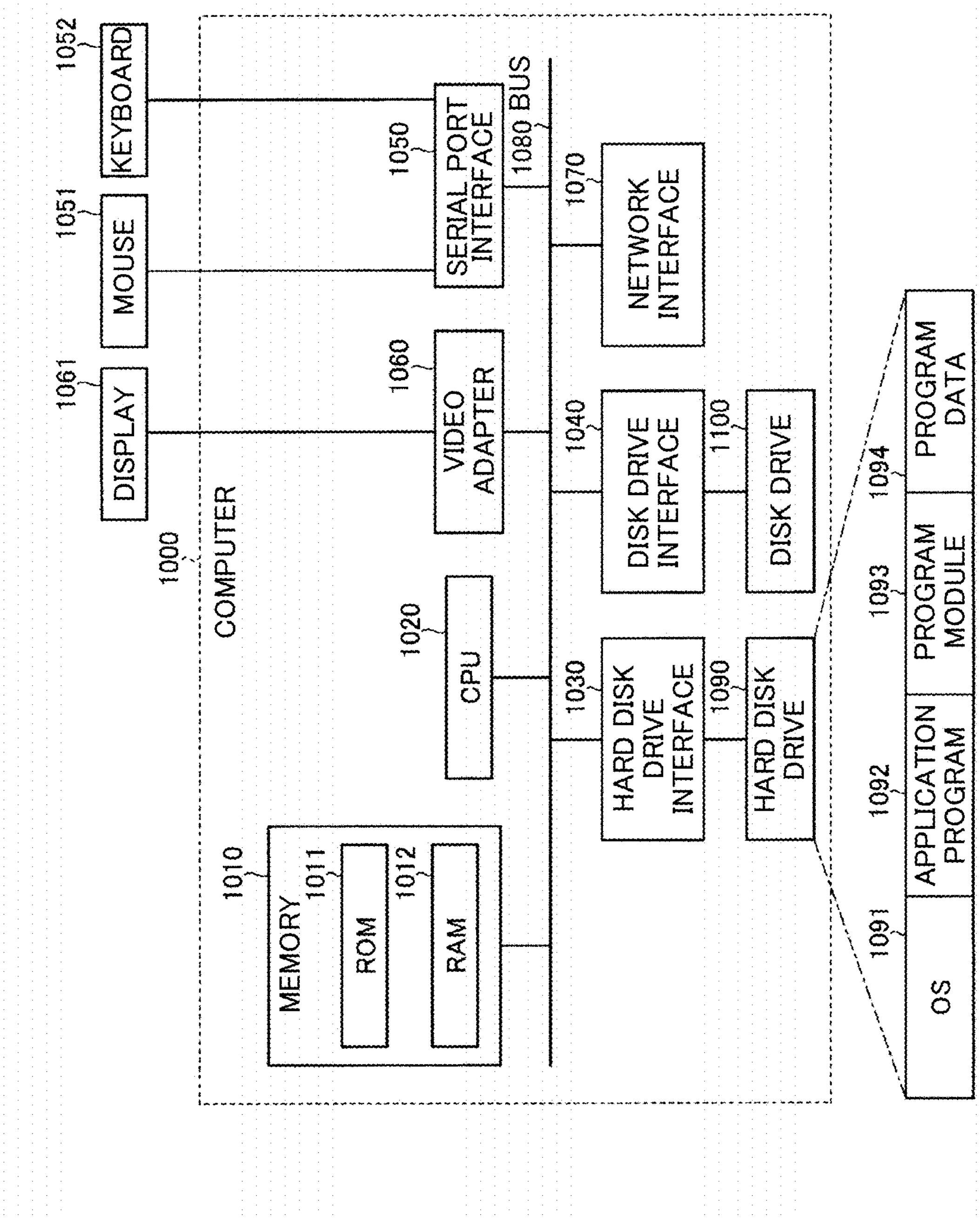
FIG. 29 is a diagram illustrating a computer that executes a discrimination program.

FIG. 29 is a diagram of a computer that executes a discrimination program. As illustrated in FIG. 29, a computer 1000 includes a memory 1010, a CPU 1020, a hard disk drive interface 1030, a disk drive interface 1040, a serial port interface 1050, a video adapter 1060, and a network interface 1070, for example. These components are connected by a bus 1080.

As illustrated in FIG. 29, the memory 1010 includes a ROM (read only memory) 1011 and a RAM 1012. The ROM 1011 stores therein a boot program such as a BIOS (basic input/output system), for example. The hard disk drive interface 1030 is connected to a hard disk drive 1090 as illustrated in FIG. 29. The disk drive interface 1040 is connected to a disk drive 1100 as illustrated in FIG. 29. Removable storage media such as magnetic disks and optical discs, for example, are inserted into the disk drive 1100. The serial port interface 1050 is connected to a mouse 1110 and a keyboard 1120, for example, as illustrated in FIG. 29. The video adapter 1060 is connected to a display 1130, for example, as illustrated in FIG. 29.

Here, as illustrated in FIG. 29, the hard disk drive 1090 stores therein an OS 1091, an application program 1092, a program module 1093, and program data 1094, for example. In other words, the discrimination program is stored in the hard disk drive 1090, for example, as a program module in which commands executed by the computer 1000 are described.

Various kinds of data described in the embodiment are stored in the memory 1010 or the hard disk drive 1090 as program data, for example. The CPU 1020 reads the program module 1093 and the program data 1094 stored in the memory 1010 or the hard disk drive 1090 into the RAM 1012 as needed and executes various processing procedures.

The program module 1093 and the program data 1094 associated with the discrimination program are not necessarily stored in the hard disk drive 1090. The program module 1093 and the program data 1094 may be stored in a removable storage medium and read by the CPU 1020 via the disk drive or the like, for example. Alternatively, the program module 1093 and the program data 1094 associated with the discrimination program may be stored in another computer connected via a network (a LAN (local area network), a WAN (wide area network), or the like) and read by the CPU 1020 via the network interface 1070.

REFERENCE SIGNS LIST

10 Information processing device
11*a* Operation input unit
11*b* Ledger sheet input unit
12 Display unit
13 OS
14 Storage unit
15 Editor
16 Ledger sheet processing tool
161 Content and position acquisition unit
162 Column type discrimination unit
163 Correction unit
164 Registration unit
165 Operation data storage unit
165*a* Content and position data
165*b* Discrimination information
165*c* Style candidate data
165*d* Region division information
165*e* Character string information
166 Style storage unit
167 Style candidate selection unit
168 Style acquisition unit
169 Basic dictionary storage unit
170 Relation recognition unit

The invention claimed is:

1. An information processing device including one or more processors configured to:

store information on a type of each column included in a ledger sheet for respective styles of a ledger sheet;

acquire, using optical character recognition, a processing target ledger sheet;

specify one or a plurality of items names corresponding to each item value in the processing target ledger sheet;

derive a relationship between item names as conditions to be satisfied by an item name in a style of the ledger sheet;

store the derived relationship as column type discrimination information;

compare a content of each column of the processing target ledger sheet to the stored information on the type of each column and the column type discrimination information;

determine whether an item name in the processing target ledger sheet satisfies a relationship between items names described in the column type discrimination information;

in response to determining the item name in the processing target ledger sheet satisfies the relationship between the item names described in the column type discrimination information, specify style candidates of the processing target ledger sheet based on the item name in the processing target ledger sheet satisfying the relationship.

2. The information processing device according to claim 1, wherein the one or more processors are further configured to:

acquire a plurality of ledger sheets having a matching layout;

compare contents of each column at a same position of each of the plurality of ledger sheets having the matching layout;

discriminate a type of each column according to a result of comparing the contents of each column at the same position of each of the plurality of ledger sheets having the matching layout; and store information on the type of each column.

3. The information processing device according to claim 1, wherein the one or more processors are further configured to:

determine whether an item name described in the column type discrimination information corresponds to a certain item name column in the processing target ledger sheet according to whether the item name in the processing target ledger sheet satisfies the relationship between the item names described in the column type discrimination information; and specify style candidates of the processing target ledger sheet.

4. The information processing device according to claim 2, wherein the one or more processors are configured to:

discriminate the type of a column as an item name when all contents of the columns at the same position in each ledger sheet match; and discriminate the type of a column as an item value when a column having a content different from the contents of columns at the same position in each ledger sheet is present.

5. The information processing device according to claim 2, wherein the one or more processors are configured to:

acquire positions of columns the plurality of ledger sheets having the matching layout;

specify the same position in each ledger sheet using the acquired positions; and compare the contents of each column at the same position.

6. The information processing device according to claim 1, wherein the one or more processors are further configured to:

refer to a basic dictionary that stores an item name previously discriminated; and discriminate the type of a column according to the basic dictionary when the content of the column is stored in the basic dictionary.

7. The information processing device according to claim 6, wherein the one or more processors are configured to learn item name discrimination conditions by applying the column type discrimination information of each style to the basic dictionary.

8. The information processing device according to claim 1, wherein the one or more processors configured to:

obtain endpoint information of a ruled line from image data of the processing target ledger sheet;

acquire a region surrounded by the ruled line;

acquire the region surrounded by the ruled line as a position of a single column;

acquire a set of character strings acquired by the optical character recognition, present in the region of the single column as the content; and combine the position and the content of the column to generate position data.

9. A discrimination method executed by an information processing device, comprising:

storing information on a type of each column included in a ledger sheet for respective styles of a ledger sheet;

acquiring, using optical character recognition, a processing target ledger sheet;

specifying one or a plurality of items names corresponding to each item value in the processing target ledger sheet;

deriving a relationship between item names as conditions to be satisfied by an item name in a style of the ledger sheet;

storing the derived relationship as column type discrimination information;

comparing a content of each column of the processing target ledger sheet to the stored information on the type of each column and the column type discrimination information;

determining whether an item name in the processing target ledger sheet satisfies a relationship between items names described in the column type discrimination information;

in response to determining the item name in the processing target ledger sheet satisfies the relationship between the item names described in the column type discrimination information, specifying style candidates of the processing target ledger sheet based on the item name in the processing target ledger sheet satisfying the relationship.

10. The discrimination method according to claim 9, further comprising:

acquiring a plurality of ledger sheets having a matching layout;

comparing contents of each column at a same position of each of the plurality of ledger sheets having the matching layout;

discriminating a type of each column according to a result of comparing the contents of each column at the same position of each of the plurality of ledger sheets having the matching layout; and storing information on the type of each column in a storage unit.

11. The discrimination method according to claim 9, further comprising:

discriminating a type of a column of a processing target ledger sheet;

determining whether an item name described in the column type discrimination information corresponds to a certain item name column in the processing target ledger sheet according to whether the item name in the processing target ledger sheet satisfies the relationship between the item names described in the column type discrimination information; and specifying style candidates of the processing target ledger sheet.

12. The discrimination method according to claim 10, further comprising:

discriminating the type of a column as an item name when all contents of the columns at the same position in each ledger sheet match; and discriminating the type of a column as an item value when a column having a content different from the contents of columns at the same position in each ledger sheet is present.

13. The discrimination method according to claim 10, further comprising:

acquiring positions of columns the plurality of ledger sheets having the matching layout;

specifying the same position in each ledger sheet using the acquired positions; and comparing the contents of each column at the same position.

14. The discrimination method according to claim 9, further comprising:

referring to a basic dictionary that stores an item name previously discriminated; and discriminating the type of a column according to the basic dictionary when the content of the column is stored in the basic dictionary.

15. The discrimination method according to claim 14, further comprising:

learning item name discrimination conditions by applying the column type discrimination information of each style to the basic dictionary.

16. The discrimination method according to claim 9, further comprising:

obtaining endpoint information of a ruled line from image data of the processing target ledger sheet;

acquiring a region surrounded by the ruled line;

acquiring the region surrounded by the ruled line as a position of a single column;

acquiring a set of character strings acquired by the optical character recognition, present in the region of the single column as the content; and combining the position and the content of the column to generate position data.

17. A non-transitory computer readable medium storing one or more instructions causing a computer to execute:

storing information on a type of each column included in a ledger sheet for respective styles of a ledger sheet;

acquiring using optical character recognition, a processing target ledger sheet;

specifying one or a plurality of items names corresponding to each item value in the processing target ledger sheet;

deriving a relationship between item names as conditions to be satisfied by an item name in a style of the ledger sheet;

storing the derived relationship as column type discrimination information;

comparing a content of each column of the processing target ledger sheet to the stored information on the type of each column and the column type discrimination information;

determining whether an item name in the processing target ledger sheet satisfies a relationship between items names described in the column type discrimination information;

in response to determining the item name in the processing target ledger sheet satisfies the relationship between the item names described in the column type discrimination information, specifying style candidates of the processing target ledger sheet based on the item name in the processing target ledger sheet satisfying the relationship.

18. The non-transitory computer readable medium according to claim 17, further comprising:

acquiring a plurality of ledger sheets having a matching layout;

comparing contents of each column at a same position of each of the plurality of ledger sheets having the matching layout;

discriminating a type of each column according to a result of comparing the contents of each column at the same position of each of the plurality of ledger sheets having the matching layout; and storing information on the type of each column in a storage unit.

* * * * *